United States Patent
Lee et al.

(10) Patent No.: US 8,719,442 B2
(45) Date of Patent: May 6, 2014

(54) SYSTEM AND METHOD FOR PROVIDING AND TRANSMITTING CONDENSED STREAMING CONTENT

(75) Inventors: Hsin-Hua Lee, Tainan County (TW); Hui-Ping Kuo, Taipei (TW); Jen-Yu Yu, Taichung County (TW); Wen-Fang Cheng, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 24 days.

(21) Appl. No.: 13/609,186

(22) Filed: Sep. 10, 2012

(65) Prior Publication Data

US 2013/0173819 A1    Jul. 4, 2013

(30) Foreign Application Priority Data

Dec. 28, 2011 (TW) .............................. 100149124 A

(51) Int. Cl.
*G06F 15/16* (2006.01)

(52) U.S. Cl.
USPC ......... 709/231; 348/14.13; 382/232; 382/236

(58) Field of Classification Search
CPC .............. H04N 21/236; H04N 21/266; H04N 7/17318; H04L 29/06; H04L 65/4076; H04L 65/4084; H04L 65/4092
USPC .................................................. 709/231, 219
See application file for complete search history.

(56) References Cited

U.S. PATENT DOCUMENTS

| | | |
|---|---|---|
| 6,704,790 B1 | 3/2004 | Gopalakrishnan |
| 7,003,154 B1 | 2/2006 | Peker et al. |
| 7,643,490 B2 | 1/2010 | An et al. |
| 7,720,983 B2 | 5/2010 | Klemets et al. |
| 7,765,574 B1 | 7/2010 | Maybury et al. |
| 2003/0231870 A1 | 12/2003 | Nagahara et al. |

(Continued)

FOREIGN PATENT DOCUMENTS

| | | | | |
|---|---|---|---|---|
| EP | 1239680 A2 | * | 9/2002 | ............... H04N 7/26 |
| JP | 2002118851 A | * | 4/2002 | ............... H04N 7/32 |

(Continued)

OTHER PUBLICATIONS

Jacob Chakareski et al., "Adaptive Systems for Improved Media Streaming Experience," Advances in Visual Content Analysis and Adaption for Multimedia Communications, Jan. 2007, pp. 77-83, IEEE, US.

(Continued)

*Primary Examiner* — Kostas Katsikis

(57) ABSTRACT

A stream condense unit coupled to a streaming server and a client player is provided. The stream condense unit includes a streaming data input unit, a stream content analysis unit, a frame timestamp adjust unit, and a streaming data output unit. The streaming data input unit is configured to receive a plurality of streaming content groups sent by the streaming server. The stream content analysis unit is configured to receive the plurality of streaming content groups, execute a content analysis to get importance scores of the source streaming contents. The frame timestamp adjust unit is configured to receive the condensed stream and adjust a timestamp of each frame in the condensed stream. The streaming data output unit is configured to receive the condensed stream and attach content identifying labels and tables to the condensed stream, and send the condensed stream to the client player to display.

21 Claims, 17 Drawing Sheets

(56) References Cited

U.S. PATENT DOCUMENTS

| | | |
|---|---|---|
| 2007/0024705 A1 | 2/2007 | Richter et al. |
| 2007/0253479 A1* | 11/2007 | Mukherjee ................. 375/240.1 |
| 2008/0131072 A1* | 6/2008 | Chang et al. .................... 386/52 |
| 2008/0140851 A1 | 6/2008 | Weigand et al. |
| 2008/0263219 A1 | 10/2008 | Bacchi et al. |
| 2008/0271082 A1 | 10/2008 | Carter et al. |
| 2009/0296701 A1* | 12/2009 | Gusic et al. .................. 370/389 |
| 2010/0161761 A1 | 6/2010 | Yu et al. |
| 2010/0223392 A1 | 9/2010 | Pond et al. |
| 2010/0318671 A1 | 12/2010 | Lee et al. |
| 2011/0008022 A1* | 1/2011 | Lee et al. ..................... 386/329 |
| 2011/0066673 A1 | 3/2011 | Outlaw |
| 2011/0109758 A1* | 5/2011 | Liang et al. ................ 348/222.1 |
| 2011/0194612 A1* | 8/2011 | Tsai ......................... 375/240.16 |

FOREIGN PATENT DOCUMENTS

| | | | |
|---|---|---|---|
| JP | 2008054330 A * | 3/2008 | |
| TW | 200951831 | 12/2009 | |
| TW | 200951832 | 12/2009 | |
| WO | WO 2007040291 A1 * | 4/2007 | |
| WO | WO 2008104127 A1 * | 9/2008 | ............... H04N 7/50 |

OTHER PUBLICATIONS

Xiaoqing Zhu et al., "Content-Adaptive Coding and Delay-Aware Rate Control for a Multi-Camera Wireless Surveillane Network," Multimedia Signal Processing, Oct. 2005, pp. 1-4, IEEE, US.

Yuheng Qiu et al., "Fast Channel Switching for Hybrid Unicast/Broadcast Mobile Television," Broadband Multimedia Systems and Broadcasting, Mar. 2008, pp. 1-4, IEEE, US.

Costas Cotsaces et al., "Video Shot Detection and Condensed Representation," IEEE Signal Processing Magazine, Mar. 2006, pp. 28-37, IEEE, US.

Xiaoyan Sun et al., "Seamless Switching of Scalable Video Bitstreams for Efficient Streaming," Circuits and Systems, 2002. ISCAS 2002, Aug. 2002, pp. III-385-III-388, vol. 3, IEEE, US.

\* cited by examiner

SYSTEM AND METHOD FOR PROVIDING AND TRANSMITTING CONDENSED STREAMING CONTENT

CROSS REFERENCE TO RELATED APPLICATIONS

This Application claims priority of Taiwan Patent Application No. 100149124, filed on Dec. 28, 2011, the entirety of which is incorporated by reference herein.

BACKGROUND

1. Field of the Disclosure

The present disclosure relates to a system and method for generating a condensed streaming content in a network.

2. Description of the Related Art

As a result of the rapid development of broadband networks, A/V Streaming has become one of the most popular applications, such as sharing audio and video files, real-time network television programs, and so on, for the purposes of entertainment. The user may obtain the information about the channels available by browsing program schedules and decide to watch the streaming content of one television program. Furthermore, in recent years, the surveillance industry has shifted from a reliance on closed circuit television (CCTV) systems to IP surveillance systems. The video source may be such as an IP camera (IPCAM), a video server, a digital video recorder (DVR), or the like. The user can monitor the surveillance cameras installed in various locations via the IP networks through the video management systems (VMS) to monitor activities in these locations. In addition to the direct end-to-end connection, a streaming server is also often used to enhance the service scale of the systems.

FIG. 1 is a schematic diagram illustrating an architecture of a streaming system. The user can use various kinds of network-connected devices 14, such as desktop personal computers (Desktop PCs), notebooks, tablet PCs, mobile phones, as a carrier to watch streaming content. When the user watches an individual streaming content, the user first establishes a streaming connection with the streaming server 12 via a network 10 through the connection control protocol, such as the Real-Time Streaming Protocol (RTSP), and then receives the real-time streaming content data 16 or the pre-stored streaming content data 18 through a media transport protocol, such as the Real-time Transport Protocol (RTP). In order to avoid poor reception quality caused by variations in the network bandwidth, a streaming buffer with a short period of time is generally used to reduce the jittering impact on the player. According to the variations in the network bandwidth and the space of the streaming buffer, it may take a few seconds to establish the entire streaming session. When the user wants to watch multiple channels of source streaming content at the same time, the user can establish multiple streaming sessions and play the streams among the various channels independently through the player.

With the maturity of mobile communications technologies, the demands of using the streaming systems through mobile devices and networks have increased. However, the mobile network is still subject to bandwidth restrictions, reception quality, and the influence of the environment. On one hand, unstable and insufficient bandwidth may cause user frustration. When the user watches multiple channels (for example, in the application for network surveillance), it is still very difficult for the user to watch multiple channels stably at the same time because all the channels are competing for bandwidth. On the other hand, there is an urgent need to provide a global channel preview for users to browse playing frames of all streaming channels quickly and decide the content which the user wants to watch and assist users to understand the changing information of the channels dynamically and automatically, such as when channels are added or removed, or the user-interested frames are played (for example, when license plates, human faces or movement and other information are detected in video surveillance scenarios). A global channel preview here represents a viewing mode that could provide videos of a lot of channels for the user to have quick glances.

Therefore, there is a need to develop a method and a system for providing and transmitting condensed streaming contents of multiple source contents.

SUMMARY

A detailed description is given in the following embodiments with reference to the accompanying drawings.

Methods and systems for providing and transmitting a condensed streaming content.

In one exemplary embodiment, the disclosure is directed to a stream condense unit, coupled to a streaming server and a client player. The stream condense unit comprises a streaming data input unit, a stream content analysis unit, a frame timestamp adjust unit and a streaming data output unit. The streaming data input unit is configured to receive a plurality of streaming content groups transmitted by the streaming server and record entries of plurality of source streaming contents, such as live and pre-stored source streaming contents, in each streaming content group into a stream input table. The stream content analysis unit is configured to receive the plurality of streaming content groups transmitted by the streaming data input unit, execute a content analysis to get importance scores of source streaming contents and output a condensed stream for each group, wherein the stream content analysis unit stores the content analysis and the importance scores into a content importance score table. The frame timestamp adjust unit is configured to receive the condensed stream sent by the stream content analysis unit and adjust a timestamp of each frame in the condensed stream, wherein the timestamps are recorded in a frame timestamp adjust table. The streaming data output unit is configured to receive the condensed stream sent by the frame timestamp adjust unit and attach content identifying labels and tables to the condensed stream, and send the condensed stream to the client player to display.

In one exemplary embodiment, the disclosure is directed to a system for generating a condensed stream, coupled to a client player. The system comprises a streaming server and a stream condense unit. The streaming server comprises a source content input unit, a content grouping unit and a source content group output unit. The source content input unit is configured to receive a plurality of source streaming contents. The content grouping unit is coupled to the source content input unit and configured to receive the plurality of source streaming contents sent by the source content input unit and group the plurality of source streaming contents into a plurality of streaming content groups according to some attributes. The source content group output unit is coupled to the content grouping unit and configured to receive the plurality of streaming content groups transmitted by the content grouping unit. The stream condense unit is coupled to the streaming server and the client. The stream condense unit comprises a streaming data input unit, and a stream content analysis unit, a frame timestamp adjust unit and a streaming data output unit. The streaming data input unit is configured to receive the plurality of streaming content groups sent by the streaming server and record entries of plurality of source streaming contents in each streaming content group into a stream input table. The stream content analysis unit is configured to receive the plurality of streaming content groups sent by the streaming data input unit, execute a content analysis to get importance scores of the source streaming contents and output a condensed stream for each streaming content group, wherein the stream content analysis unit stores the content analysis and the importance scores into a content importance score table. The frame timestamp adjust unit is configured to receive the condensed stream transmitted by the stream content analysis unit and adjust the timestamp of each frame in the condensed stream, wherein the timestamps are recorded in a frame timestamp adjust table. The streaming data output unit is configured to receive the condensed stream transmitted by the frame timestamp adjust unit and attach content identifying labels and tables to the condensed stream, and send the condensed stream to the client player to display.

In one exemplary embodiment, the disclosure is directed to a client player, coupled to a streaming server and a stream condense unit. The client player comprises a streaming data receive unit, a condensed stream extract unit, at least one decoder unit instance and a video rendering unit. The streaming data receive unit is configured to receive a condensed stream of a streaming content group sent by the stream condense unit. The condensed stream extract unit is coupled to the streaming data receive unit and configured to receive the condensed stream sent by the streaming data receive unit, and extract a plurality of source streaming contents from the condensed stream. The at least one decoder unit instance is configured to receive the plurality of source streaming contents extracted by the condensed stream extract unit, decode the plurality of source streaming contents and generate a plurality of videos. The video rendering unit is configured to render the decoded video frames of plurality of videos.

In one exemplary embodiment, the disclosure is directed to a method for providing and transmitting a condensed stream, the method is used in a stream condense unit, wherein the stream condense unit is coupled to a streaming server and a client player. The method comprises: receiving, by a streaming data input unit, a plurality of streaming content groups; recording, by the streaming data input unit, entries of plurality of source streaming contents in each streaming content group into a stream input table; executing, by a stream content analysis unit, a content analysis to get importance scores of source streaming contents; storing, by the stream content analysis unit, the content analysis and the importance scores into a content importance score table; outputting, by the stream content analysis unit, a condensed stream for each streaming content group; adjusting, by a frame timestamp adjust unit, a timestamp of each frame in the condensed stream and recording the timestamps in a frame timestamp adjust table; attaching, by a streaming data output unit, content identifying labels and tables to the condensed stream; and transmitting, by the streaming data output unit, the condensed stream to the client player to display.

In one exemplary embodiment, the disclosure is directed to a method for providing and transmitting a condensed stream, the method is used in a system for providing and transmitting a condensed stream, wherein the system includes a streaming server, a stream condense unit and a client player. The method comprises: receiving, by a source content input unit, a plurality of source streaming contents; grouping, by a content grouping unit, the plurality of source streaming contents into a plurality of streaming content groups according to some attributes; recording, by a streaming data input unit, the entries of plurality of source streaming contents of each streaming content group into a stream input table; executing, by a stream content analysis unit, a content analysis to get importance scores of the source streaming contents; storing, by the stream content analysis unit, the content analysis and the importance scores into a content importance score table; outputting, by the stream content analysis unit, a condensed stream for each streaming content group; adjusting, by a frame timestamp adjust unit, the timestamp of each frame in the condensed stream and recording the timestamps in a frame timestamp adjust table; attaching, by a streaming data output unit, content identifying labels and tables to the condensed stream; and transmitting, by the streaming data output unit, the condensed stream to the client player to display.

In one exemplary embodiment, the disclosure is directed to a method for receiving, processing and presenting a condensed stream, the method is used in a client player, wherein the client player is coupled to a stream condense unit. The method comprises: receiving, by a streaming data receive unit, a condensed stream sent by the stream condense unit; extracting, by a condensed stream extract unit, a plurality of source streaming contents from the condensed stream; decoding, by at least one decoder unit instance, the plurality of source streaming contents and generate a plurality of videos; and rendering, by a video rendering unit, the plurality of videos.

BRIEF DESCRIPTION OF DRAWINGS

The present disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
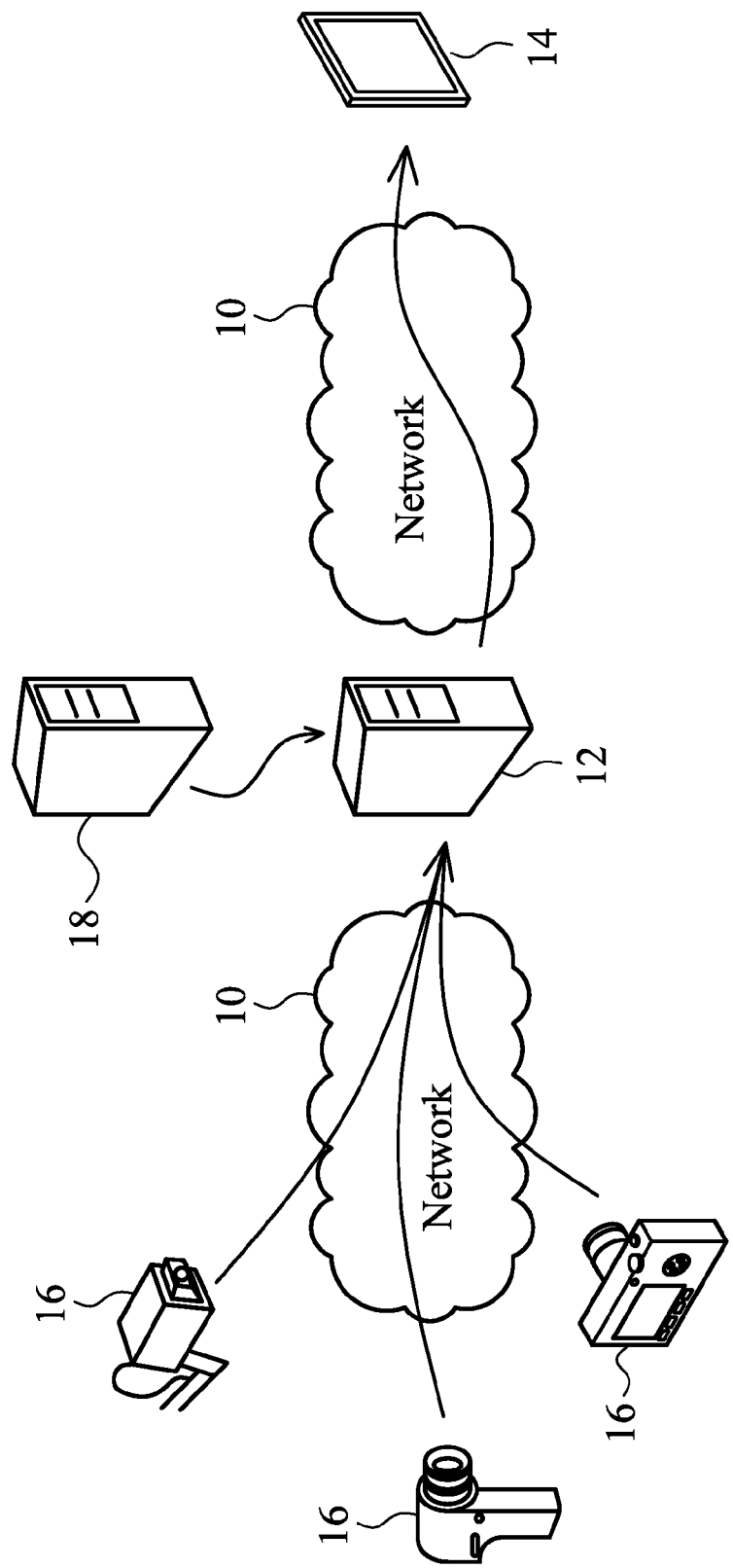
FIG. 1 is a schematic diagram illustrating the architecture of a streaming system of prior art.
Figure 2:
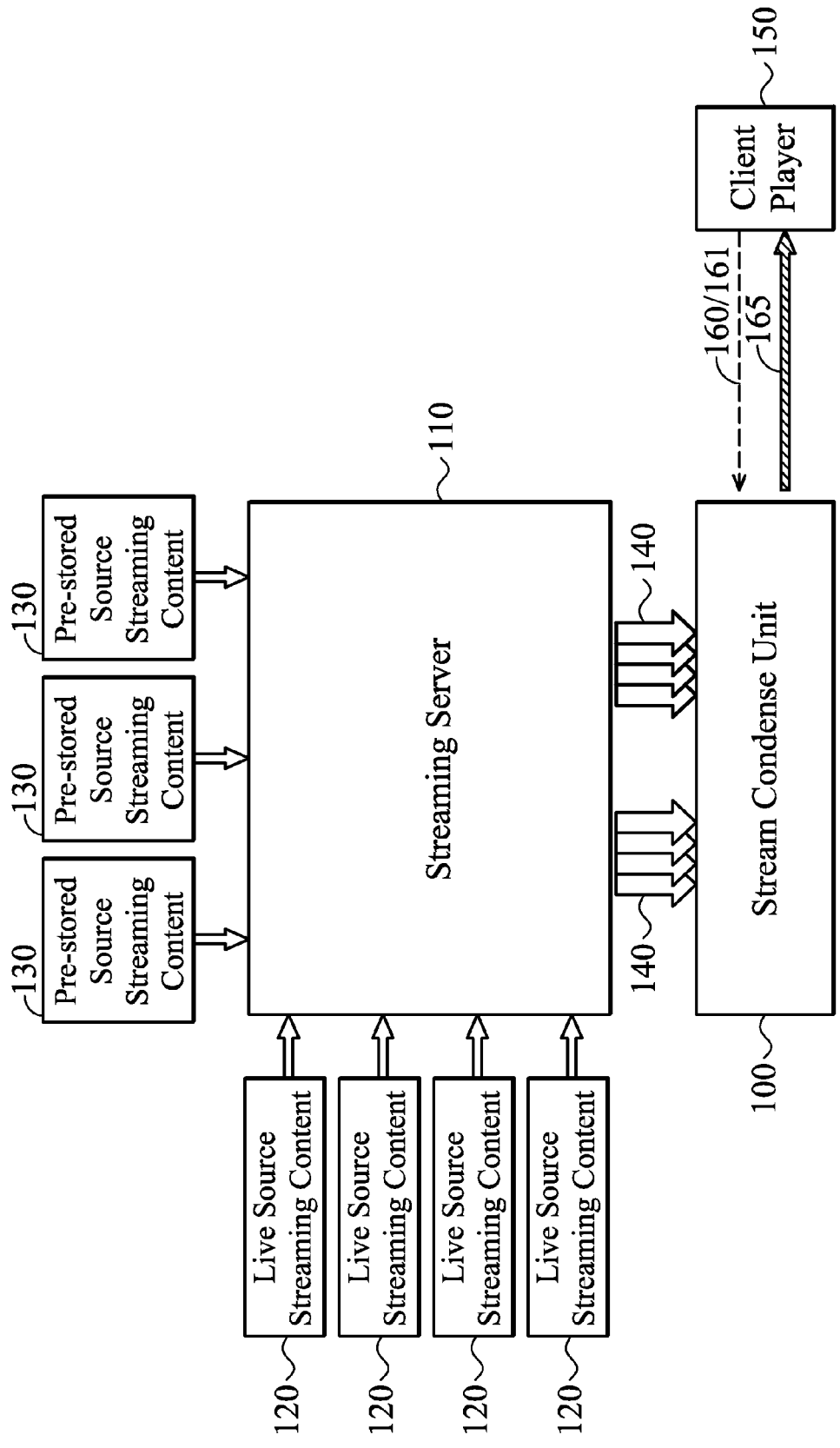
FIG. 2 is an architecture diagram of a system according to an embodiment of the present disclosure.

FIG. 2 is a block diagram illustrating the system architecture according to an embodiment of the present disclosure. The system comprises a stream condense unit 100, a streaming server 110 and a client player 150.

In this system, a plurality of live source streaming contents 120 and pre-stored source streaming contents 130, or so called VoD (Video on Demand) contents which are stored in some certain storage media, are published and transmitted to the streaming server 110 by using a wired or wireless link through Internet Protocol (IP) network. As used herein, the term "streaming" may refer to a mode of multi-media processing which allows a user (e.g., the client player 150) to download multi-media content while playing the portions of the multi-media content which has already been downloaded. Unlike a conventional "download-and-play" mode that only allows a user to play multi-media content when the whole multi-media content has been downloaded, the "streaming" mode is able to support real-time multi-media processing. A multi-media source streaming content (or simply referred as source streaming content hereafter) refers to a multi-media content from a single source, which comprises contents such as video, audio, text, images, other media or any combination thereof. For example, an output streaming content of the IP camera (IPCam) is a kind of live source streaming content 120. Audio and video content stored as a file (e.g., MP4 or 3GP) is a pre-stored source streaming content 130. MP4, which has an official filename extension of MPEG-4 Part 14, is a multi-media computer file format using the MPEG-4 file. The filename extension of MP4 is .mp4. The MP4 format is ordinarily used to store digital audio and digital video streams. 3GP file is a simplified version of MP4. The image portion may use Motion JPEG, MPEG-4 Part 2, H.263 or MPEG-4 Part 10 (AVC/H.264) for storage. The sound portion may use AMR-NB, AMR-WB, AMR-WB+, AAC-LC or HE-AAC for encoding of the sound. The file format and the encoding format mentioned in the disclosure are used for illustration purposes and are not limited to those disclosed herein.

The streaming server 110 may be a device or a node, such as a workstation, a computer or other processor, and used to process, send and receive the source streaming content information in real-time. The source streaming content information described above may be a location, a link address and a description of the media content, such as the Real-Time Streaming Protocol Uniform Resource Identifier (RTSP URI). The streaming server may include a plurality of internal modules which are configured to receive, send, record and classify the source streaming contents. The internal modules may be executed by hardware or software according to the design complexity, the number of sessions handled at the same time, and the speed of operation. Each streaming content received by the streaming server 110 is transmitted via separate streaming sessions.

The streaming server 110 analyzes the attributes and profiles of these source streaming contents and classifies all the input video, audio, text, images, other media or any combination thereof contents in accordance with the analysis results. In one embodiment, the classification may include but not be limited to the encoding profile of the video contents, such as the encoder format (H.264, MPEG4, MJPEG, H.263, etc.), encoding bitrate, group of picture (GOP) size, frame rate, or image format analytical results, such as the resolution. The classification process may also include a geographical location attribute, such as the such as the longitude and latitude of the GPS location, the access right in a social community of the source streaming contents (for example, a user group leader and may have more permissions than a normal member) and the content descriptions such as the abstract of the video, the author or other classification attributes.

The multi-media source streaming contents classified by the streaming server 110 are transmitted to the stream condense unit 100 with the other source streaming contents of the same classification group in a grouped manner. In this embodiment, as shown in FIG. 2, the streaming server 110 divides all the input source streaming contents into an input streaming content group I 140 and an input streaming content group II 140. In this embodiment, the stream condense unit 100 can exist in an independent machine. The transmission manner in this embodiment may transmit the source streaming contents in the form of a stream through a network socket. In another embodiment, the stream condense unit 100 which may also be a module exists with the streaming server 110 in the same machine. The transmission manner in this embodiment may be implemented through a local socket or a way of sharing a physical memory unit.

The client player 150 may request the streaming server 110 for the source streaming contents through the network directly, or request the stream condense unit 100 to provide a condensed stream of a certain input streaming content group to display. The stream condense unit 100 may transmit a condensed stream 165 (or referred as condensed streaming content) to the client player 150 through a condense stream request 160 for a condensed stream.

The client player 150 may be a personal computer (PC), notebook, mobile device (e.g., a mobile phone), digital player, personal digital assistant (PDA) and mobile terminal, or other kinds of terminal which can access the network.

It is worth noting that, the stream condense unit 100, the streaming server 110 and the client player 150 can be connected to each other by using wired or wireless transmission through Internet Protocol (IP) network. The wired transmission uses a transmission medium for connection, such as an optical network, asymmetric digital subscriber line, (ADSL), cable network, powerline network and the like. The wireless transmission may be constituted by using some mobile or wireless Internet Protocol (IP) network link mechanism through the general mobile/wireless network technology, such as Global System for Mobile communications (GSM) utilizing a second-generation mobile communication technology protocol, Code Division Multiple Access (CDMA), General Packet Radio Service (GPRS) utilizing 2.5G mobile communication technology, Wireless Local Area Network (WLAN), and third-generation mobile communication technology or Wideband Code Division Multiple Access (WCDMA), Universal Mobile Telecommunications System (UMTS), Enhanced Data rates for a GSM Evolution (EDGE), Wireless EDGE (WEDGE), Time Division-Synchronous Code Division Multiple Access (TD-SCDMA), High Speed Downlink Packet Access (HSDPA) utilizing a 3.5 Generation mobile communication technology, Worldwide Interoperability for Microwave Access (WIMAX), and 3GPP Long Term Evolution (LTE).

The communication of the source streaming contents among the stream condense unit 100, the streaming server 110, and the client player 150 may use the Real-Time Streaming Protocol (RTSP). The receiving or sending of data may be controlled through Real-time Transport Protocol (RTP) and Real-time Transport Control Protocol (RTCP). The data can be transmitted through Transmission Control Protocol (TCP) or User Datagram Protocol (UDP).

Figure 3:
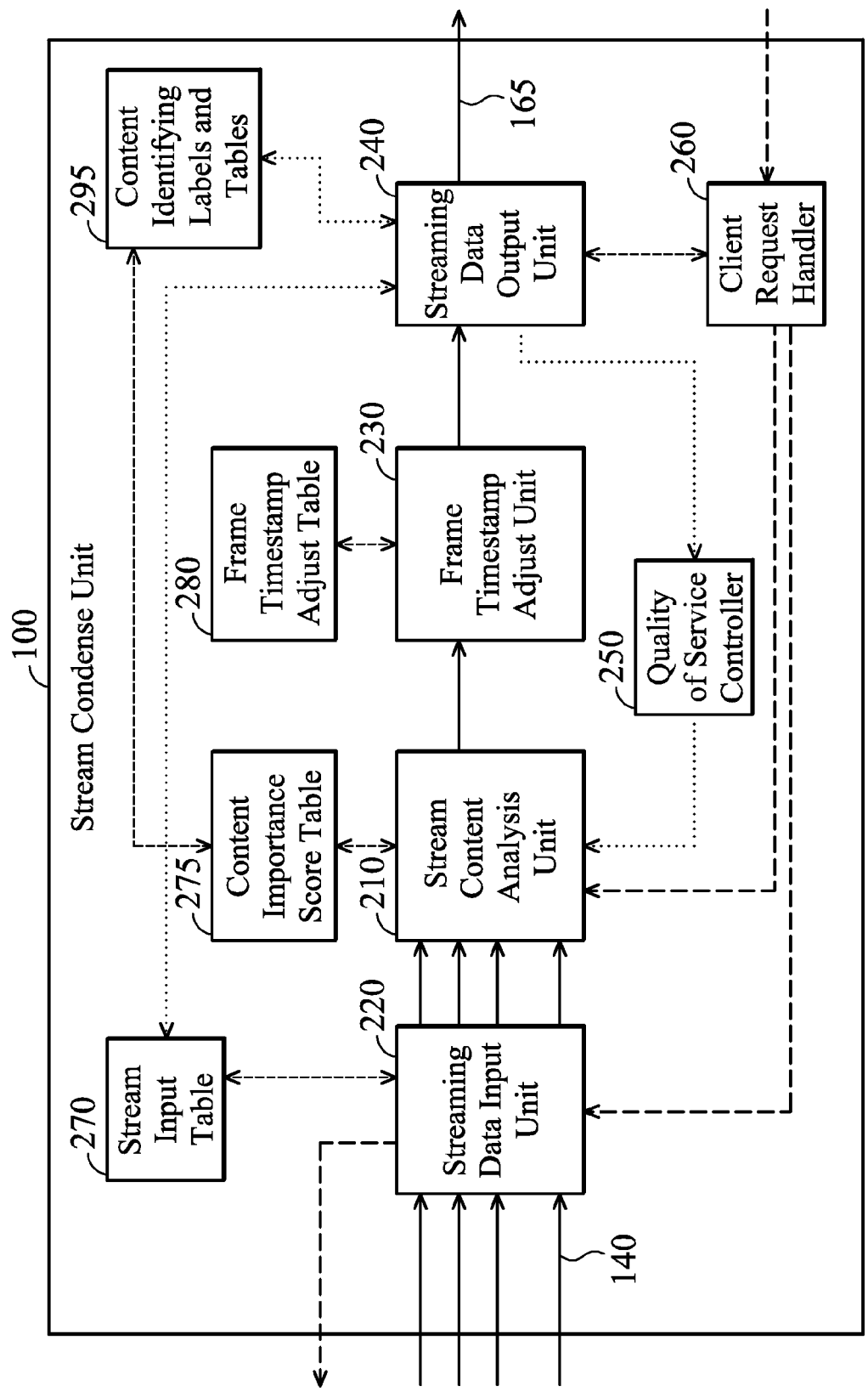
FIG. 3 is an architecture diagram of a stream condense unit according to an embodiment of the present disclosure.

FIG. 3 is an architecture diagram of a stream condense unit 100 according to an embodiment of the present disclosure. The stream condense unit 100 comprises a streaming data input unit 220, a stream content analysis unit 210, a frame timestamp adjust unit 230, a streaming data output unit 240, a quality of service (QoS) controller 250, and a client request handler 260.

First of all, when the source streaming contents of the input streaming content group 140 is inputted to the stream condense unit 100, the source streaming contents are transmitted to the stream content analysis unit 210 through the streaming data input unit 220. The streaming data input unit 220 receives the streaming data and records the entry of all source streaming contents in each input streaming content group into a stream input table 270. For example, the stream input table 270 records the source streaming content identifiers, which could be the uniform resource identifier or the description of the source streaming contents in each input streaming content group. For example, in some embodiments the MD5 hash method can be used to hash the Uniform Resource Identifier (URI) of each source streaming content respectively along with video shooting time or the video author to generate a unique source streaming content identifier. The stream input table 270 also records the group identifiers, which includes identification codes and the grouping categories associated with each input streaming content group, such as encoding attributes (e.g., the encoding format, the frame rate, or the video format), semantic attributes (e.g., geographic locations, video shooting time, video shooting events, video author, and the access right in a social community), or static properties (e.g., predetermined and specific groups). Specifically, but not limited to such examples, the stream input table 270 can be transmitted using the Real-time Transport Protocol header extension (RTP Header Extension) and Real-time Transport Control Protocol (RTCP) packets within the stream of input streaming content group 140, wherein different source streaming contents have unique identification codes, i.e. source streaming content identifiers, as identification labels. When a source streaming content is added into or removed from the input streaming content group, the streaming data input unit 220 can update the stream input table 270.

In an alternative embodiment, plurality of streaming servers can be coupled to one streaming server and input streaming content groups from different stream servers could be either treated as different groups or the same group if these groups have the same grouping attributes. When multiple streaming servers are coupled to the same stream condense unit, the streaming data input unit 220 can also record the streaming servers information (e.g., the IP address), from which the source streaming contents come in the input streaming content group into the stream input table 270.

In another alternative embodiment, one streaming server can also be coupled to plurality of condense units so that each condense unit is responsible for a certain input streaming content groups of the streaming server. In this disclosure, at least one streaming servers can be coupled to at least one stream condense units and the combination of the streaming servers and stream condense units in this disclosure should not be limited to the embodiments described above.

The streaming content analysis unit 210 performs a content analysis on the inputted frames in each source streaming content of each input streaming content group. After analyzing the content and getting the importance scores of source streaming contents, the streaming content analysis unit 210 records and stores the content importance scores in a content importance score table 275. For example, the content importance score table 275 records detected events, current and cumulative scores, the importance weights of different source streaming contents, categories and weights of the analysis events, numbers of the output key sequence frames, thresholds of the output scores, the number of frames selected to output, and so on. In one embodiment, the content analysis can be some video analysis for detecting some special events to determine the importance of the content, including but not limited to, the variation degrees of images, face detections, unattended objects, missing objects, or license plate detections to calculate the importance scores for selecting the frames with representative content. More specifically, the importance scores can be determined according to the intensity of the event. In different analysis domain, the intensity of the event may be determined according to the variation (e.g., the variation degree of the image) or the block size detected in frame (e.g., the detection of unattended/missing objects). In some certain embodiments, the scores calculated by the stream content analysis unit through a variety of analysis may be weighted, so that the scores of the different events may be calculated and compared in the follow-up procedure.

In an alternative embodiment, when not detecting related events in a specific video, the streaming content analysis unit 210 may determine the importance score of the frames when the amount of data or the time interval of frames reaches a certain threshold through inspecting the amount of data or the time interval of frames of each input source streaming content. For example, if each source streaming content is set to be transmitted to the client player 150 within at least a certain time interval T. After the time interval T, if no event occurred in a certain source streaming content, that source streaming content can still get a higher output importance score for being selected to be outputted to the condensed stream.

Compared to an inter-coded frame, such as a predicted frame (e.g., P frame), the intra-coded frame, such as an intra frame (e.g., I frame), includes complete frame information. Therefore, in some embodiments, the content of an intra-coded frame is also more representative and should get a higher importance score for being selected to be outputted.

In accordance with the importance scores recorded in the content importance score table 275, the streaming content analysis unit 210 can determine whether a frame or a frame sequence at a certain time spot of a certain input source streaming content has enough importance that the frame or the frame sequence can be selected and outputted into a part of a condensed stream.

The streaming content analysis unit 210 can be further illustrated from another point of view. When the frame of a certain inputted source streaming content is analyzed and considered to have sufficient importance scores, it represents that the frame is important and representative for the source streaming content and that video frame or the video sequence can be selected to output as the representative frame or frames. The method of another embodiment is that the key frame before or after the event occurred (the frame is usually an intra-coded picture) is adopted as a representative frame. Because a single intra-coded frame solely contains complete data of the original content for decoding, which can be transmitted to the client player 150 to decode and display alone.

Figure 4:
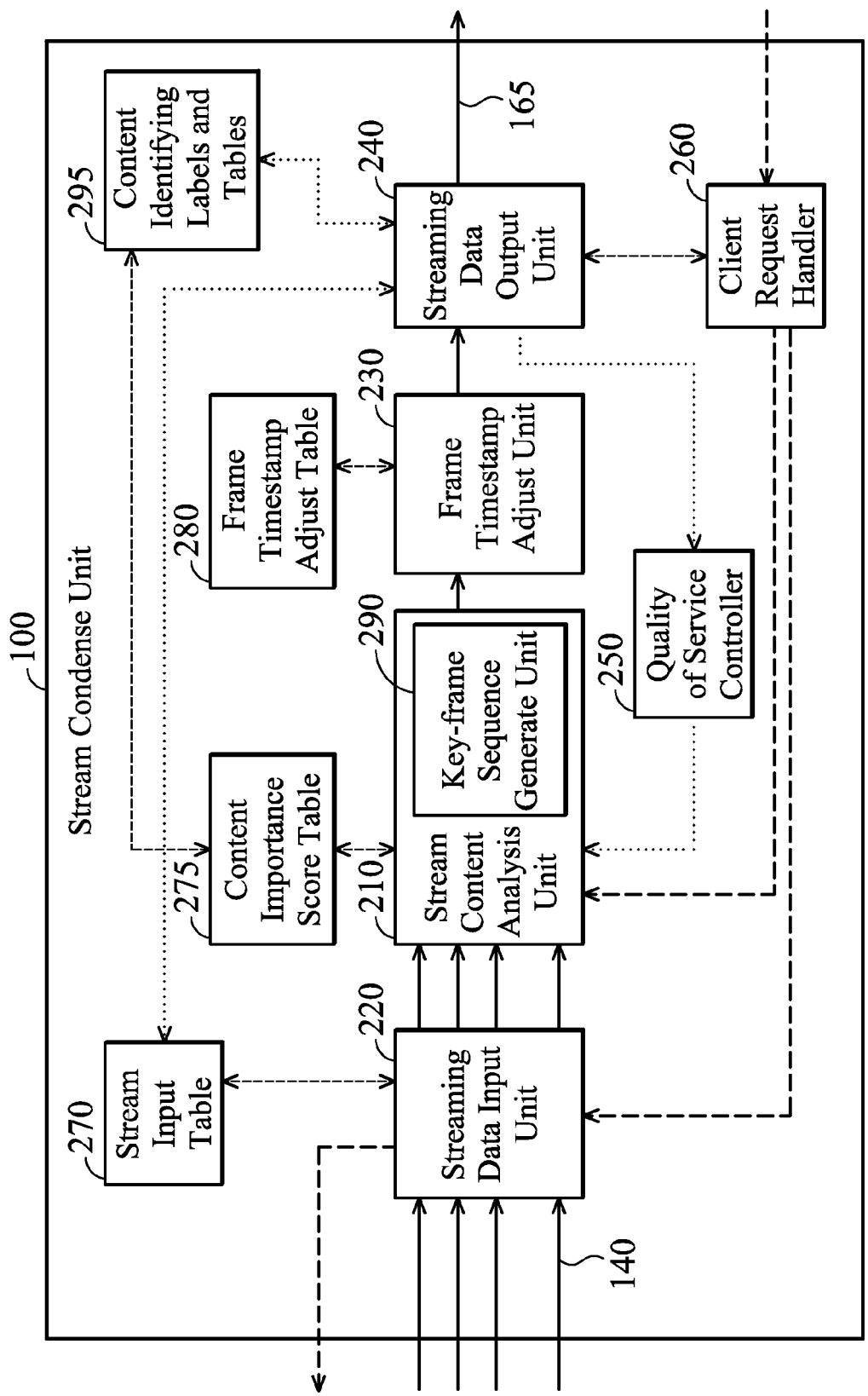
FIG. 4 is an architecture diagram of a stream condense unit according to an embodiment of the present disclosure.
Figure 5:
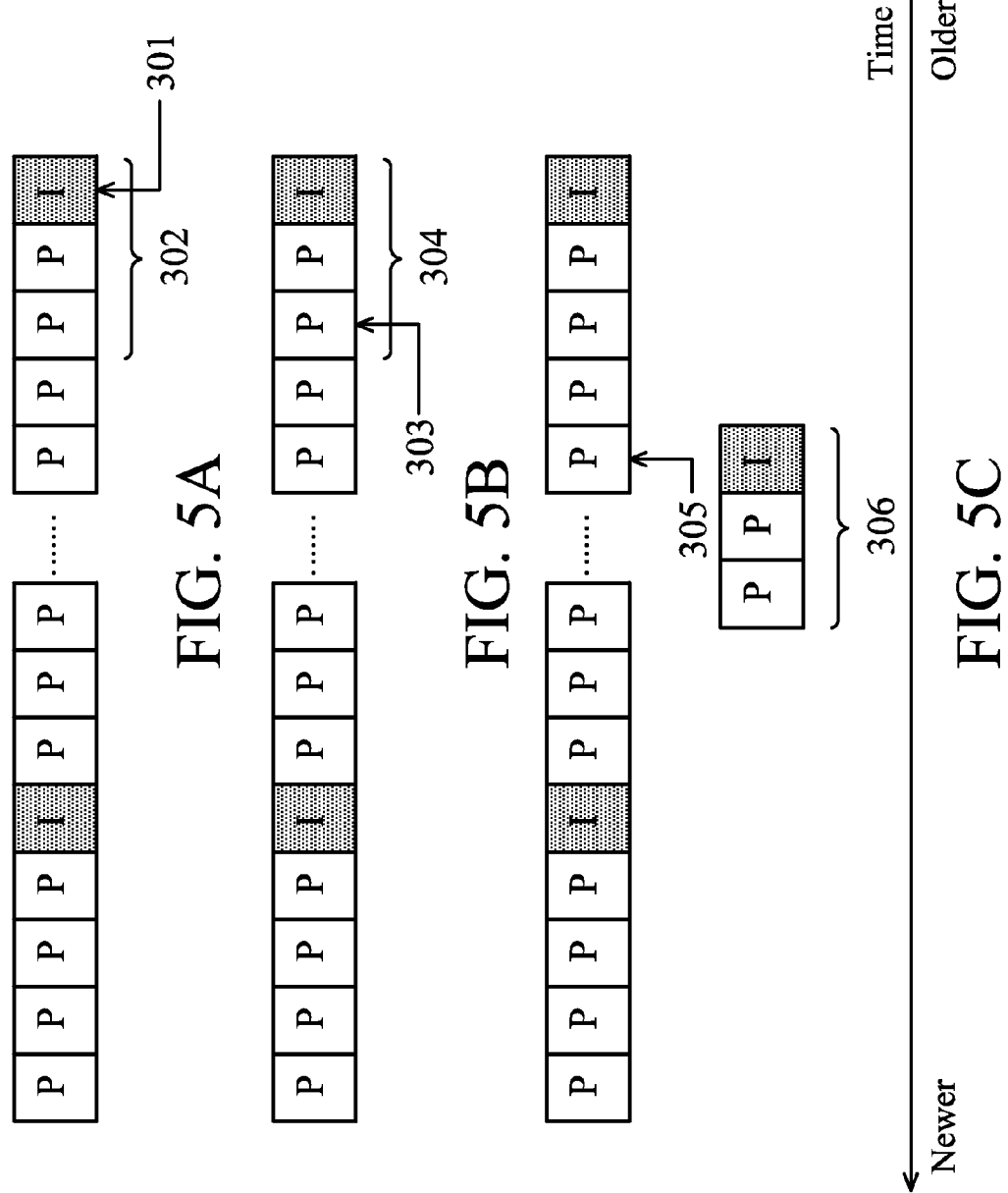
FIGS. 5A~5C are schematic diagrams illustrating that the key-frame sequence generate unit generates a key frame sequence according to an embodiment of the present disclosure.

FIG. 4 is an architecture diagram of a stream condense unit 100 according to an embodiment of the present disclosure. In this embodiment, the streaming content analysis unit 210 further comprises a key-frame sequence generate unit 290. When a frame selected by the streaming content analysis unit 210 as a representative frame is not a key frame, the representative frame may be re-encoded in an intra-coded way and outputted through the key-frame sequence generate unit 290. FIGS. 5A~5C are schematic diagrams representing how the key-frame sequence generate unit 290 generates a key frame according to an embodiment of the present disclosure. As shown in FIGS. 5A~5C, "I" and "P" are I frames and P frames, respectively. Furthermore, the I frames are the key frames of the source streaming content. The key frame sequence which consists of an I frame and two successive P frames is adopted for illustration in this embodiment. But in some certain embodiments, whether to use a key frame sequence (instead of a single key frame) and the number of frames chosen to be outputted to the key frame sequence will still vary and depend on the event categories, the importance and the available bandwidth. As shown in FIG. 5A, when the representative frame selected by the streaming content analysis unit 210 is a key frame I 301, the streaming content analysis unit 210 also selects the I frame 301 and two P successive frames as a key frame sequence 302. When the representative frame selected by the streaming content analysis unit 210 is a P frame 303, as shown in FIG. 5B, the streaming content analysis unit 210 finds the P frame 303 representative, therefore the I frame and successive P frames which are earlier than the P frame 303 selected to compose a key frame sequence 304 and output. When the representative frame selected by the streaming content analysis unit 210 is a P frame 305, wherein there is no I frame which is to the P frame 305, as shown in FIG. 5C, the streaming content analysis unit 210 uses intra coding to re-encode the P frame 305 to an intra-coded key frame I, and then selects the re-encoded I frame and two successive re-encoded P frames to compose a key frame sequence 306. In the embodiments, for a stream in which the group of picture (GOP) length is particularly long, this method can prevent the time interval between the representative frame and the neighboring key frame from being too long and thus losing the representative when selecting that neighboring key frame.

Besides the modules or processors that perform some certain content analysis methods, the stream condense unit 210 is further comprised of an intermediate buffer holding the video frames of each source streaming content previously inputted for a period of time so that when some certain events are detected in a certain source streaming content, previously inputted frames of that source streaming content can be provided by the intermediate buffer to output a representative frame sequence. In different embodiments, the content analysis performed can either be in compressed-level or pixel-level. For compressed-level analysis, it directly takes the compressed bitstream to perform the analysis. For pixel-level analysis, it takes uncompressed image, which could be in a variety of forms of color space, to perform the analysis. In the embodiments using pixel-level analysis, the content analysis unit 210 is further comprised of at least one decoder module to decode the bitstream of each source streaming content to do the pixel-level content analysis.

The quality of service controller 250 may continuously detect the congestion status of the network between the stream condense unit 100 and the client player 150 and determine whether the amount of data sent exceeds the available network bandwidth; or the amount of the data to be sent can be increased. This quality of service controller 250 feeds back the estimated results to the streaming content analysis unit 210 to adjust the degree of the condensation ratio and the threshold of the importance scores, so that the amount of the condensed data can be closed to but not exceeding the available bandwidth to client player. The detailed technical content about the design of the quality of service controller 250 may further refer to such as U.S. Pub. 2010/0161761 Yu et al. (Method for Audio and Video the Control the Response and Bandwidth Adaptation Based on Network, Streaming Applications and Server Using the Same).

After analyzing plurality of inputted source streaming contents which are in the input streaming content group 140, from each inputted source streaming content the streaming content analysis unit 210 may select a video frame or a video sequence, which represents great content significance for that source streaming content at that time spot, as the representative outputted stream. In accordance with the difference of the degree of the condensation ratio, the streaming content analysis unit 210 may select frames or frame sequence from one or multiple source streaming contents outputted as the frames or sequences in a condensed streaming content at each time spot. Specifically, for example, if the bandwidth which is estimated by the quality of service controller 250 is poor, the streaming content analysis unit 210 may only output one frame corresponding to a specific event source when the degree of the condensation ratio is higher and some specific events are detected in the source streaming content. On the other hand, if the bandwidth which is estimated by the quality of service controller 250 is still sufficient, the degree of the condensation ratio or the threshold of the importance scores can be lower. In this case, the frames in plurality of inputted source streaming content can be selected at the same time and outputted by the streaming content analysis unit 210. In some certain embodiments, whether the streaming content analysis unit 210 determines to select and output a single key frame or a key frame sequence, or whether the streaming content analysis unit 210 selects multiple input sources at the same time is also related to the capability and restrictions of client player. For example, if some certain client players can not decode multi-channel videos at the same time, or some certain client players only provide a single render area, the streaming content analysis unit 210 may adopt a higher degree of the condensation ratio and outputting multiples sources of streaming contents at the same time will not happen.

The adjustment of the condensation ratio is further explained. For example, the lower degree of the condensation ratio may refer to a condition wherein the threshold of the importance scores may be more loose (therefore, more different events can be detected and selected), or more frames in a sequence for each detected event can be outputted. On the contrary, the higher degree of the condensation ratio may refer to a condition wherein the threshold of the importance scores may be stricter or fewer frames for each detected event can be outputted (therefore, the detected events become fewer and fewer). In some embodiments, the degree of the condensation ratio can be adjusted dynamically or can be adjusted according to a variety of configuration settings selected in advance corresponding to different streaming contents, events to be detected and different network bandwidth conditions.

In an alternative embodiment, when the importance score of the frame content selected by the streaming content analysis unit 210 reaches a certain threshold and the bandwidth reported by the quality of service controller 250 allows a lower condensation ratio, the streaming content analysis unit 210 can also output the video sequence consisting of the selected frames and the successive frames within a period of time to provide a better presentation for some certain events and let the user understand the content in the condensed stream more easily. In one embodiment, the video sequence consisting of the selected frames and the successive frames within a period of time can be a video sequence started with the key frame presented earlier or later, in the time order, than that selected representative frame, as shown in FIG. 5A and FIG. 5B. In an alternative embodiment, as in FIG. 5C, the video sequence may consist of a key frame, which is an re-encoded intra-frame of the selected frame, and the successive re-encoded frames generated by the key frame sequence generate unit 290.

Specifically, though not limited to such examples as illustrated herein, Table 1 shows a weight table of the event importance. Table 2 shows the content importance score table 275. Table 1 and Table 2 represent one embodiment by using the weight table of the event importance and the content importance score table 275 to select frames of the condensed streaming content. As shown in Table 1, different types of events are assigned with different weight for each input streaming content group. Besides, each source streaming content in each input streaming content group is also assigned a different weighting factor, as shown in Table 2. When detecting the types of the events in different source streaming contents, the streaming content analysis unit 210 computes the importance score of the content in each source according to the weight of detected events and the weighting factors of each source, as shown in Table 2. Then, the streaming content analysis unit 210 updates and records the results into the score table of the content importance. The weight of the events and the weighting factors of different sources could be pre-defined or changed dynamically to meet the application or interests of the user.

TABLE 1

| Index | Event Type | Weight |
| --- | --- | --- |
| 1 | Showtime threshold | 20 |
| 2 | License Plate Detection | 10 |
| 3 | Face Detection | 5 |
| 4 | Unattended Object Detection | 3 |
| 5 | Motion Detection | 2 |
| 6 | N/A | 1 |

TABLE 2

| Source streaming content identifier | Weighting factor | Event | Current Score | Accumulated Score up to the last time | Accumulated Score |
| --- | --- | --- | --- | --- | --- |
| Source 1 | 1.5 | 1, 2 | 30 × 1.5 | 15.5 | 60.5 |
| Source 2 | 1.0 | 3, 5 | 7 × 1.0 | 36.0 | 43.0 |
| Source 3 | 1.0 | 4 | 3 × 1.0 | 18.0 | 21.0 |
| Source 4 | 0.75 | 6 | 1 × 0.75 | 14.5 | 15.25 |

Figure 6:
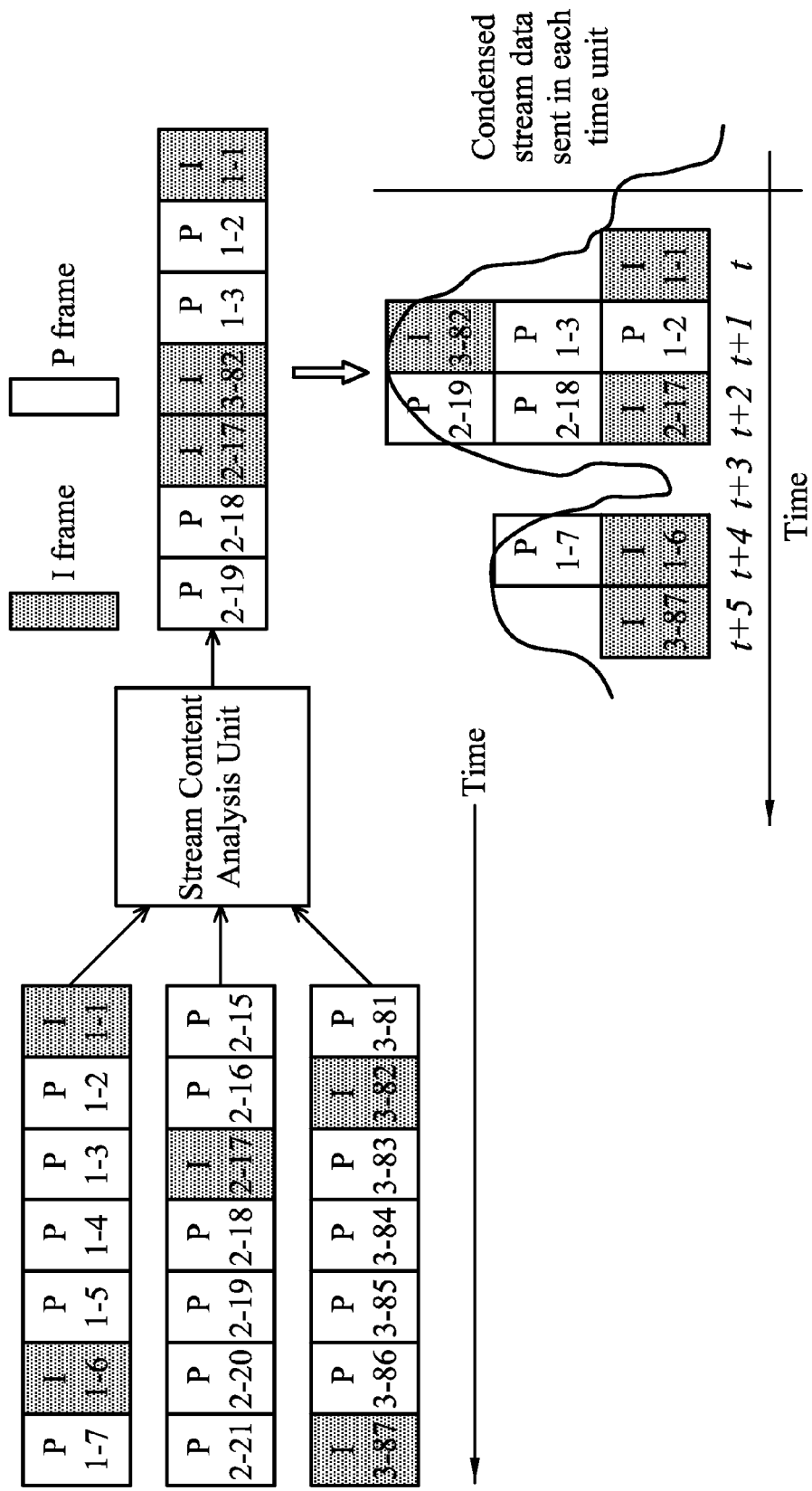
FIG. 6 is a schematic diagram illustrating that the streaming content analysis unit selects and outputs the frames according to an embodiment of the present disclosure.

FIG. 6 is a schematic diagram illustrating how the streaming content analysis unit 210 selects the frames according to an embodiment of the present disclosure. In an alternative embodiment, the condensed streaming content outputted by the streaming content analysis unit 210 may be shown in FIG. 6. The video are classified into I frames and P frames. The meaning of the number below the frames is that, for example, 1-2 represents that the source streaming content identifier is 1 and the timestamp of the frame is 2. Because the time spots when respective source streaming content start to transmit the video frames may not be the same, the videos from different sources streaming content may have their respective timestamp sequences.

The condensed streaming content outputted by the streaming content analysis unit 210 can be inputted to the frame timestamp adjust unit 230. Because of the dependency of the video decoding sequence, the I frame and the successive P frames in the same source streaming content must been outputted adjacently. Therefore, in this embodiment, the frames with the decoding dependency in the same source streaming content must be outputted continuously and adjacently through the method of adjusting the timestamps. As shown in FIG. 6, it can be noticed that the time order of the frames in the outputted condensed streaming content is different from the order received in each original source streaming content (for example, the timestamp ordering of the frames of the condensed streaming content is 1-1, 1-2, 1-3, 3-82; however, the frame with the timestamp 3-82 is received earlier than the frame timestamp 1-3 in the original source streaming contents according to the order in time they are received). Therefore, the timestamps of the condensed streaming content may not increase monotonically before the timestamp being adjusted. At each time moment, the actual amount of the condensed stream could be transmitted may also vary with the bandwidth between the client player 150, as shown in the lower right of FIG. 6.

In some embodiments of this system, because of the capability constraint of the client player 150 (for example, the capability constraints of rendering divided areas or the resources of the decoder unit), the client player 150 must switch the condensed streaming contents, which are comprised of different source streaming contents, in turn to display the condensed streaming contents through a single decoder unit and a render area. Therefore, in these embodiments, the sequence of the timestamps which do not increase monotonically may result in disorder in the frame playback order and timing control. In these embodiments, the frame timestamp adjust unit 230 can adjust the timestamps in each frame of the condensed streaming content so that the client player 150 can decode and render the frames of the condensed streaming content smoothly according to the correct time order, which implies adjusting the frame order in the condensed stream so that the frames in the same source content stream can be displayed continuously and adjacently.

In addition, in some embodiments, the time interval of the timestamps between the frames can further be adjusted by the frame timestamp adjust unit 230 to achieve the effect of changing the time interval of some frames or frame sequences to render for some contents which are either more important or less important.

Specifically, H.264 video transmission through the Real-time Transport Protocol (RTP) is used as an example. The timestamp field unit in the Real-time Transport Protocol header is 1/90000, which means that the timestamp increased by 90000 units represents for 1 second. When a certain event is detected, the streaming content analysis unit 210 outputs a key frame sequence which consists of a key frame and two successive frames. When the output rate of the original streaming content is 15 frames per second, which means the timestamp interval of each frame is 6000, in some embodiments, the timestamp interval can be adjusted to 15000 so that the original playing time can be extended from 6000×3/90000=$\frac{1}{5}$ seconds to 15000×3/90000=$\frac{1}{2}$ seconds to increase the visual proportion and get better emphatic effect for some certain important events or contents. In some embodiments, according to the capabilities and constraints of the client player, if the client player has the capabilities of decoding and displaying multi-channel videos at the same time, each streaming contents can be considered as separate streams and be displayed respectively in a different region. The frame timestamp adjust unit 230 may only be used to adjust the timestamp intervals to change the emphatic effect for a specific event on rendering.

The timestamps before and after the adjustment can be recorded in the frame timestamp adjust table 280 as a basis for adjusting the timestamps of the follow-up frames. More specifically, but not limited to such examples, the content recorded in the frame timestamp adjust table 280 can include the input timestamps and the scales of the source streaming contents inputted into the stream condense unit 100, and the output timestamps of the condensed stream. The content recorded in the frame timestamp adjust table 280 is listed in Table 3 according to one embodiment. In Table 3, the fields record the timestamps and the scales corresponding to the timestamps when each condensed stream is outputted from the respective sources. The timestamps and the scales can be the reference for computing the timestamps in the following frames.

The condensed stream identifier field in the frame timestamp adjust table 280 and the content analysis unit 210 are generated for each time when a new client requests for a condensed stream (a new condensed stream session is established), which implies: although different clients can request condense stream of the same input streaming content group, a different condensed stream identifiers may still be generated to create a new entry in the frame timestamp adjust table 280 and the content analysis unit 210. For example, the resource identifier of the condensed stream (e.g. URI of the condensed stream) along with the session established time by each client could be taken to the hash calculation to generate an unique condensed stream identifier by using the MD5 hash algorithm. The unique condensed stream identifier can be stored for follow-up mapping and query. For each client player, the request-issuing time (which may change the weighting or the threshold of selecting representative frame for some certain events or sources in the streaming content analysis unit 210), the bandwidth (which affects the amount of frame outputted) and the capability of the client device (which may affect how the timestamp adjust unit 230 should adjust the timestamp) may all be different, it implies that the timestamp scale parameter used and the timestamps in condensed stream sent toward different client player will all be different, too.

TABLE 3

| Condensed stream identifier | Source streaming content identifier | Input timestamp | Scale | Output timestamp |
| --- | --- | --- | --- | --- |
| ABC | Source 1 | 330000 | 90000 | 90000 |
| | Source 2 | 1268000 | 90000 | 96000 |
| | Source 3 | 5100 | 90000 | 87700 |
| XYZ | Source 1 | 330000 | 60000 | 217000 |
| | Source 2 | 1268000 | 90000 | 198000 |
| | Source 4 | 72000 | 90000 | 187200 |
| | Source 5 | 90000 | 75000 | 180000 |

The condensed stream which is composed of plurality of source streaming contents from the different sources is transmitted to the streaming data output unit 240. The frames selected to be outputted to the condensed stream with the adjusted timestamps are composed by the streaming data output unit 240 and transmitted through one single streaming session to the client player. Therefore, the client player 150 establishes only one session to receive the condensed stream from beginning to end. More specifically, but not limited to such examples, the stream condense unit 100 provides the client player 150 with the location and the connecting mode of the condensed stream, wherein the location and the connecting mode can be a complete Real-Time Streaming Protocol Uniform Resource Identifier (RTSP URI), such as rtsp://11.22.33.44:554/condensed_stream_123. The client player 150 can obtain the condensed stream of a certain group named 123 through the uniform resource identifier to establish one single session for a certain condensed stream. In another example, the client player 150 can use a uniform resource identifier such as rtsp://11.22.33.44:554/condensed_stream?codec=h264&format=D1&gis=XYZ to obtain a condensed stream with properties such that the codec is H.264, the dimension of the video is D1 and the geographical location is in region XYZ. In some certain embodiments, when coupled to multiple streaming servers, the client player can attach the identification information of the server to request a condensed stream originated from a certain specific server. For example, the client player 150 can use a uniform resource identifier such as rtsp://11.22.33.44:554/condensed_stream?codec=h264&server=ignore to obtain a condensed stream composed of the contents with the properties such that the codec is H.264 and the server from which the source contents originated is ignored. In another example, rtsp://11.22.33.44:554/condensed_stream?codec=h264&server=server1 indicates to obtain a condensed stream originated from the server "server1" and the codec property of the condensed stream is H.264.

In some embodiments, when transmitting the condensed stream, the streaming data output unit 240 may attach the content identifying labels and tables 295, which are used to identify the source of the outputted frame or the frame sequence or carry the information corresponding to a certain source, into the packets of the frames or the frame sequences of different source streaming contents. More specifically, the 'labels' indicated here in the content identifying labels and tables 295 in this embodiment are source streaming content identifiers for the client player to map and query for a certain source of streaming content.

In some certain embodiments, when transmitting the condensed stream, the streaming data output unit 240 may also attach a table of the content identifying labels and tables 295 which is used to declared all the source streaming contents composed in the condensed streaming contents so that the client player 150 can know how many and what source streaming contents are composed in the received condensed stream. The 'table' indicated here in the content identifying labels and tables 295, i.e. content identifying table, can include source streaming content identifiers, condensed stream identifiers, group identifiers and grouping categories, such as some encoding attributes (e.g., the encoding format, the frame rate, or the video format), some semantic attributes (e.g., geographic locations, video shooting time, video shooting events, video author and the access right in a social community), or some static attributes (e.g., some specific and predetermined grouping attributes, copyright descriptions such as the access account of source streaming content). In another embodiment, the table of the content identifying labels and tables 295 can also include, such as weighting factors used by the streaming content analysis unit 210 and shown in Table 1, and the list of event analysis results shown in Table 2 (e.g., types and weights of the events). More specifically, but not limited to such examples, the content identifying labels and tables may be transmitted in the RTP header extension and the packet of the Real-time Transport Control Protocol (RTCP), wherein each source streaming content has its unique identifier as the identifying label. For example, the MD5 hash method can be used to generate a unique identifier. The frequency of transmitting the content identifying table may be in a constant rate or transmitted only on the content identifying table being updated (when a source streaming content is added or removed). In further examples, the aforementioned identifying labels in the header extension can be used as an index to querying the contents of the content identifying table. When receiving the data originated from different stream sources, the client player may use the identifying labels to identify the original streaming content and query the detailed information in the content identifying table.

The client request handler 260 is a processing module used to receive the stream composition adjust requests 161 from the client player 150. When receiving and displaying the condensed stream 165, the client player 150 can extract the content identifying labels and tables 295 which are attached to the condensed stream packets by the streaming data output unit 240 and use the labels and tables to identify the source streaming contents. If the user is interested in the content in the frames or frame sequences of a certain specific source streaming content, the client player 150 can issue a stream composition adjust request 161 to the client request handler 260 for the specific source streaming content through the identifying labels and tables associated with the specific source streaming content.

On receiving the stream composition adjust request 161, the client request handler 260 can use the identifying labels and tables, which are sent by the client player and specifies some certain source streaming content, to query the streaming data output unit 240 and the content identifying labels and tables 295 to find out which source streaming content the client was requesting for. Then, the client request handler 260 can know which source streaming content was requested by the client player 150 (via the stream input table 270). In some certain embodiments, the stream composition adjust requests 161 from the client player 150 can change the weight of the importance of a certain source streaming content. In this embodiment, the weights used to calculate the importance scores of a certain source by the stream content analysis unit 210 can be changed permanently or temporarily according to the stream composition adjust requests 161 from the client player 150 so that the stream content analysis unit 210 can raise (or reduce) the composition ratio of a certain source streaming content in the output condensed stream permanently or temporarily.

In an alternative embodiments, the client player 150 can request the stream content analysis unit 210 to change the weighting factors for a certain event when the stream content analysis unit 210 analyzes and calculate the importance score so that the composition of certain event can be raised (or reduced) permanently or temporarily.

Figure 7:
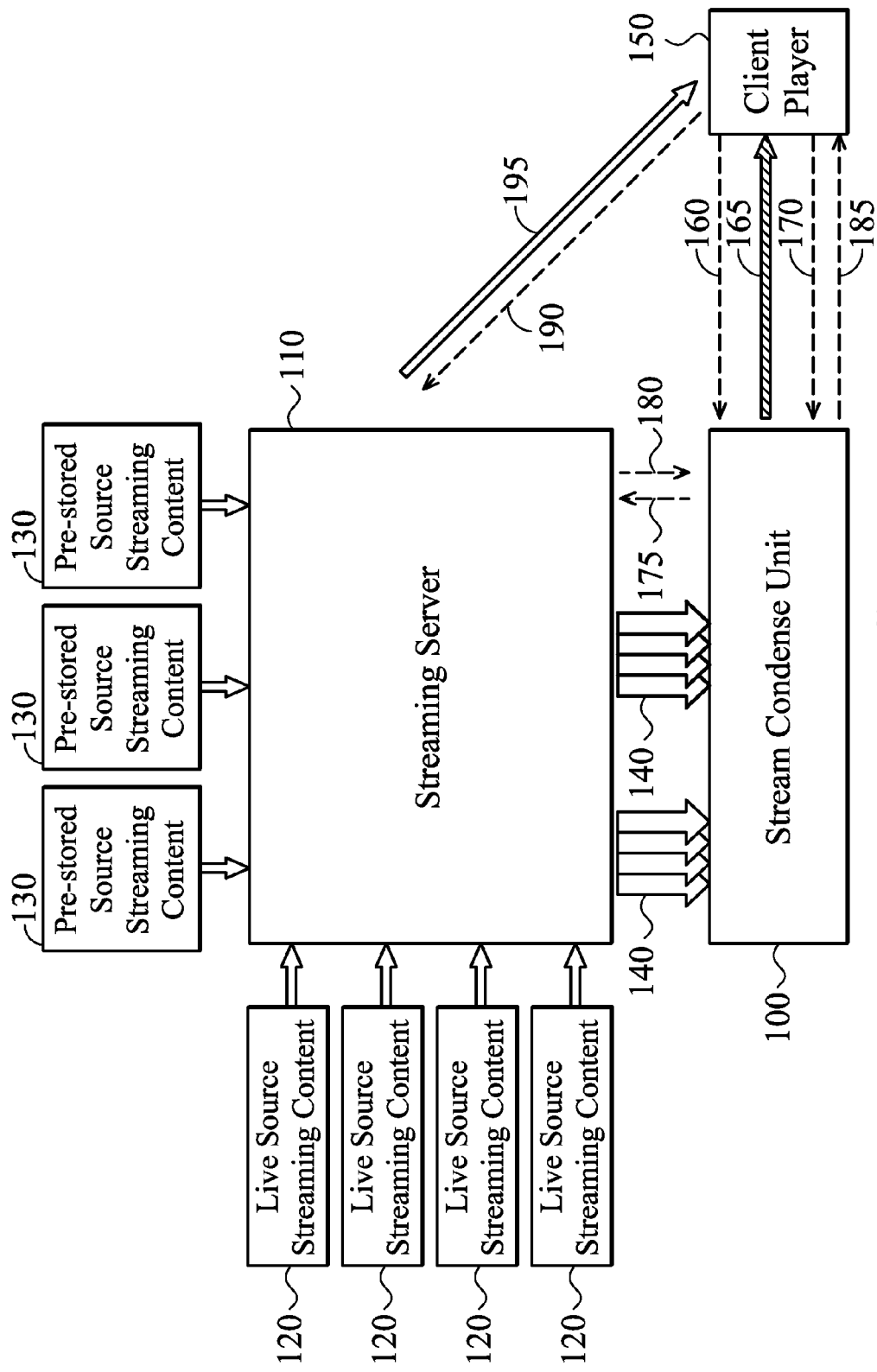
FIG. 7 is a schematic diagram illustrating that a client player queries and obtains a certain source streaming content from the streaming server through the stream condense unit according to an embodiment of the present disclosure.

In another embodiment, the client source request 170 issued from the client player 150 may also request the streaming server 110 for an original source streaming content through the streaming data input unit 220 directly. FIG. 7 is a schematic diagram illustrating that a client player queries and obtains a certain source streaming content from the streaming server 110 through the stream condense unit 100 according to an embodiment of the present disclosure. In this embodiment, the client player 150 can request to view a source streaming content without condensation process originated from the streaming server 110 directly through a session request 190. After receiving the session request 190, the streaming server 110 transmits a source direct-single streaming 195 to the client player 150 to display.

As shown in FIG. 7 and FIG. 3, in the above-mentioned process that the stream condense unit 100 provides the condensed stream to the client player, the streaming data input unit 220 can update the stream input table 270, the content importance score table 275, and the frame timestamp adjust table 280 in response to the source streaming content added into (or left from) the streaming server 110 dynamically by examining each input streaming content group to compose the newly added source streaming content into the condensed stream (or remove the left source streaming content from the condensed stream). The streaming data output unit 240 can update the content identifying labels and tables 295 attached in the condensed stream according to the added or removed source streaming contents in the stream input table 270. In updating the content identifying labels and tables 295, the client player 150 can understand the source streaming contents condensed into the condensed stream and the change of the composition (adding and reducing) of the source streaming contents.

In addition, a person skilled in the art of streaming transmission should be able to understand that when plurality of client players 150 request for the same input streaming content group, each client players 150 may obtain different QoS result detected by the quality of service controller 250 because of the connection established by each client player 150 is different; each client player 150 can issue different stream composition adjust requests 161 for different condensed streams of the same input streaming content group in accordance with the interests of each user. Therefore, according to the above conditions, it should be able to understand that even though each client player 150 requests a condensed streams 165 comprised of the same input streaming content group through the same resource identifier (e.g. RTSP URI), the condensed streams 165 actually received by each client player 150 will have different composition of the condensed streams because of different QoS results detected by the quality of service controller 250, different ways the timestamp adjusted by the timestamp adjust unit 230 and different stream composition adjust requests 161 issued for the condensed streams.

In addition, the client player 150 can request for some certain specific contents, which is not processed by the stream condense unit 100, by issuing a client source request 170. The stream condense unit 100, as a proxy, sends a forwarded client source request 175 to the streaming server 110 according to what is requested by the client player 150 in the client source request 170 to query the access of the original source of that source streaming content. After receiving the forwarded client source request 175 issued from the stream condense unit 100, the streaming server 110 responds a server-response message 180 of the location and the connecting mode of the queried stream queried by the stream condense unit 100, e.g. a uniform resource identifier (URI) of the queried source streaming content. Finally, the stream condense unit 100 respond a forwarded server-response message 185, which is a message forwarding the results in the server-response message 180 just received, to the client player 150.

Figure 8:
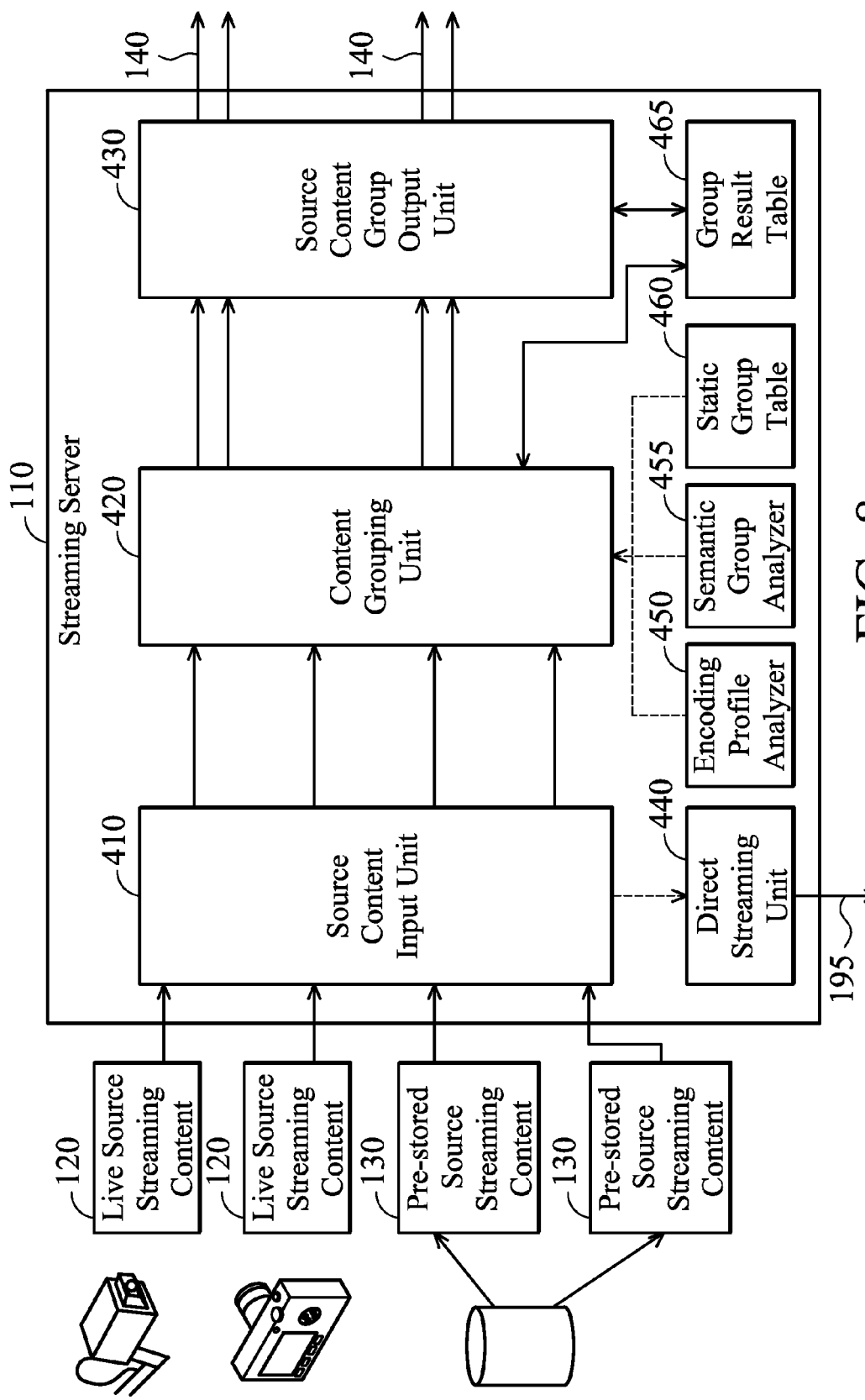
FIG. 8 is a schematic diagram illustrating the architecture of a streaming server according to an embodiment of the present disclosure.

FIG. 8 is a schematic diagram illustrating the architecture of a streaming server 110 according to an embodiment of the present disclosure. As shown in FIG. 8, the streaming server 110 includes a source content input unit 410, a content grouping unit 420, a source content group output unit 430, a direct streaming unit 440, an encoding profile analyzer 450, a semantic group analyzer 455, a static group table 460, and a group result table 465.

First, a variety of different source streaming contents including the live source streaming contents 120 and the pre-stored source streaming contents 130, which may be stored in some storage media for the streaming transmission, are inputted to the source content input unit 410 in the streaming server 110. And the source content input unit 410 will generate a source streaming content identifier for each source streaming content. For example, in some embodiments the MD5 hash method can be used to hash the Uniform Resource Identifier (URI) of each source streaming content respectively along with video shooting time or the video author to generate a unique source streaming content identifier. The direct streaming unit 440 can receive a streaming connection request issued from the client player 150, and directly transmit the original streaming content received from the source content input unit 410 to the client player 150.

Except for the design of the above-mentioned streaming server, after being input into the source content input unit 410, the source streaming contents are transmitted to the content grouping unit 420 in this disclosure. The content grouping unit 420 classifies the inputted source streaming contents according to the content analysis results. In some certain embodiments, the content grouping unit 420 can use the encoding profile analyzer 450 to classify the inputted source streaming contents according to the encoding format, frame rate or video format of the streaming contents, and so on. In an alternative embodiment, the semantic group analyzer 455 can be used to classify the inputted source streaming contents according to the semantic attribute of the source streaming contents. Specifically, but not limited to such examples, the semantic group analyzer 455 can be used to classify the inputted source streaming contents according to geographical location, shooting events, access right in a social community or other attributes. In an alternative the static group table 460 can be used to classify the input sources according to the classification of the static definition. For example, certain sources using some predefined access accounts would be classified into a specific group; or certain source streaming contents that comes from a predefined range of Internet address (e.g. IP address) would be classified into another specific group.

In accordance with the results after the content grouping unit 420 grouping all the inputted source streaming contents, the inputted source streaming contents are grouped and transmitted to the stream condense unit 100 in a form of an input streaming content group 140 by the source content group output unit 430. Then, the stream condense unit 100 generates a condensed stream for the streaming contents in each input streaming content group 140. The grouping results, which specify what input streaming content group each source streaming content belongs to, can be recorded in the group result table 465. Specifically, but not limited to such examples, the content of the group result table 465 records the source streaming content identifiers for each source streaming content, the classification groups to which each source streaming content belongs (for example, source streaming content A belongs to group 123), or the category attributes of each source streaming content in some embodiments (for example, the encoder category of source streaming content B is H.264 and the attribute of the geographical location attribute is in the XYZ region). In addition, the group result table 465 may also record the way how the source streaming contents in each group are transmitted in a 'grouped' manner, wherein this embodiment could be the port numbers, the group identifiers or category attributes. For example, a certain group may use some certain range of transmission port numbers or some certain group identifiers that used to identify that group. Specifically, for example, some certain transmission port numbers can be used to transmit the content of a certain group (for example, the ports 5556-5560 are used to transmit the streaming contents which belong to group 123). In an alternative embodiment, some unique attribute labels can be used, as group identifiers, to attach to the field in the content transmitted to the stream condense unit (for example, content for which has encoder H.264 is attached with the label "h264" when transmitted to the stream condense unit). In some embodiments, the attribute information of the server name can also be attached to the group identifier field to let the stream condense unit recognize the streaming server from which each input streaming content group originates when the stream condense unit is coupled to multiple streaming servers.

In some embodiments, the group result table 465 can also include the groups, the category representatives, or the attributes in the grouping results. This might include, for example, the encoding attributes (e.g., the encoding format, the frame rate, or the video format), the semantic attributes (e.g., geographic locations, video shooting time, video shooting events, video author and the access right in a social community), the static attributes (e.g., a predetermined and specific grouping), and the streaming content addresses (e.g., Real-Time Streaming Protocol Uniform Resource Identifier (RTSP URI)).

The manner of transmitting the grouping results to the stream condense unit 100 mentioned in this disclosure can specifically, though not limited to such examples, be as follows: the transmission manner of the input streaming content group 140 can be regularly transmitting the result recorded in the group result table 465 so that the stream condense unit 100 can obtain the information including the groups and the categories that each source content in the input streaming content group 140 belongs to. The transmission manner of the input streaming content group 140 can also be achieved by attaching some certain group identifiers to those streaming contents belonging to the same group or transmitting the streaming contents of different groups through different transmission ports. Specifically, taking Real-time Transport Protocol (RTP) as an example, the manner for transmitting the group result table or the group identification information can be achieved by attaching the group identifiers to the RTP header extension field in the RTP packets or using the Real-time Transport Control Protocol (RTCP) packets to transmit the group result table. The group identifiers described in this embodiment can be characters with some significant meaning or some unique and special encoded characters, such as the codes hashed with MD5 algorithm.

In the grouping process, when there is newly added source streaming content in the streaming server 110, the content grouping unit 420 analyzes and determines which input streaming content group that newly added source streaming content should belong to according to the method described above. Then, the source content group output unit 430 informs the streaming data input unit 220 that there is newly added source streaming content, and updates in stream input table 270 should be done. Finally, the source streaming contents belonging to the same group are sent to the stream condense unit 100 for generating an updated condensed stream. In some embodiments, content grouping unit 420 can also add some certain source streaming contents to a new group even this source streaming content has been previous received and assigned to another group. For example, a source streaming content originally belongs to a group XXX (geometrical location in a region XXX) may be assigned to another group YYY (geometrical location in a region YYY) by examining the geometrical location attribute in content grouping unit 420 if the geometrical location of source streaming content has moved to the region YYY.

In a similar situation, when a certain source stops transmitting the source streaming content or a certain source streaming content leaves the original group that the source streaming content originally belongs to, the source content group output unit 430 may also inform the streaming data input unit 220 to remove the certain source streaming content from the stream input table 270. For example, the streaming data input unit 220 can be informed that a certain source streaming content leaves via updating the group result table or a packet with a special command. In some embodiments, the reason that leaving from a certain streaming content group could be not possessing some certain attributes anymore. For example, a mobile network camera leaving a region XYZ could also make the source streaming content of that mobile network camera leave the source content group with geographical attribute XYZ. In some embodiments, the special command which informs the client player of the leaving of some certain source streaming content could be a RTCP packet with a source streaming content identifier associated with that leaving source streaming content.

In an alternative embodiment, one single source streaming content can also belong to plurality of input streaming content groups 140 at the same time. More specifically, the streaming server 110 in this embodiment can transmit only one copy of source streaming content to the stream condense unit 100, but the table entry for that source streaming content can be found in multiple group result tables. However, in another embodiment, the streaming server 110 can still transmit multiple copies of the source streaming content for each input streaming content group 140 which that streaming content belongs to the stream condense unit 100. For example, different ports can be used to establish different connections for transmitting different copy of the same streaming content for different groups; or different group identifiers can be attached to different copy of the source streaming content as the identification for different input streaming content group.

Figure 9:
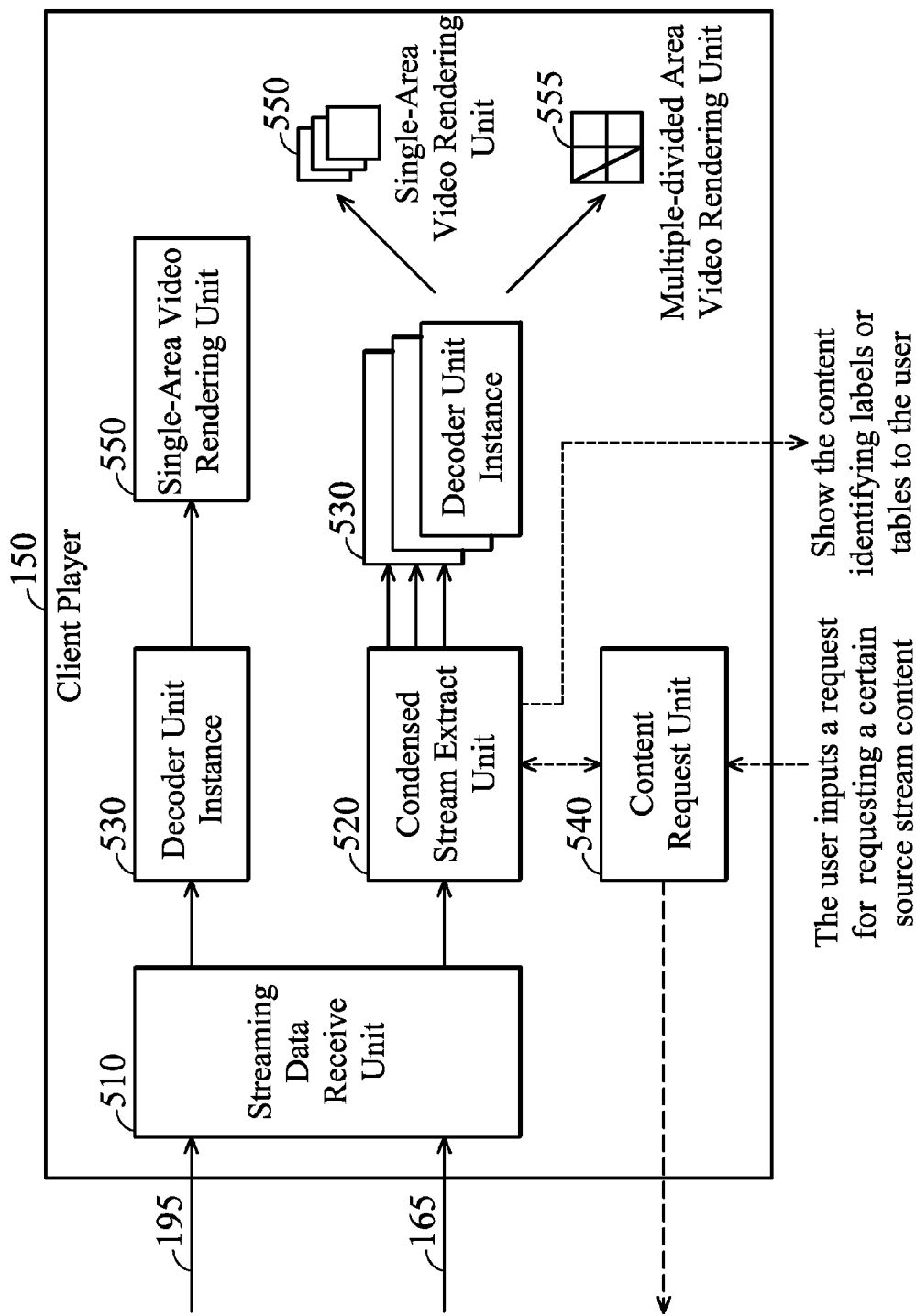
FIG. 9 is an architecture diagram illustrating a client player according to an embodiment of the present disclosure.

FIG. 9 is an architecture diagram illustrating a client player 150 according to an embodiment of the present disclosure. The client player 150 includes a streaming data receive unit 510, a condensed stream extract unit 520, at least one decoder unit instance 530 and a single area video rendering unit 550. The client player 150 can be a portable mobile device.

The client player 150 is divided into two parts. One part in which the streaming receive unit 510 receives a direct-single streaming 195 from the direct streaming unit 440, and then the direct-single streaming 195 can be rendered by a single-area video rendering unit 550 after being decoded by the decoder unit instances 530. The design of this part is well-known in the art of designing a multimedia streaming player.

In this disclosure, in addition to the part that is well-known in its design of the client player, the other part is the one in which the streaming data receive unit 510 receives the condensed stream 165 transmitted from the stream condense unit 100 through a Real-Time Streaming Protocol Uniform Resource Identifier (RTSP URI), such as rtsp://11.22.33.44:554/condensed_stream_123. Specifically, the streaming data receive unit 510 obtains a condensed stream of a streaming content group named 123 through the URL listed above. In another example, the streaming data receive unit 510 obtains a condensed stream through a RTSP URI, such as rtsp://11.22.33.44:554/condensed_stream?codec=h264&format=D1&gis=XYZ to obtain a condensed stream composed of contents with certain attributes, wherein the codec is H.264, the dimension of the video is D1 and the geographical location is in the XYZ region. The condensed stream is transmitted to the condensed stream extract unit 520. In the condensed stream extract unit 520, the source streaming contents and the content identifying labels and tables 295 which are associated with the source streaming contents are extracted from the condensed stream. The content identifying labels and tables 295 extracted, which is transmitted from the stream condense unit 100, can include condensed stream identifiers which can be used to identify the received condensed stream, source streaming content identifier which can be used to identify different source streaming contents in the condensed stream, group identifiers which can be used to identify the input streaming content group and list of grouping categories, such as encoding attributes (e.g., the encoding format, the frame rate, or the video format), semantic attributes (e.g., geographical locations, shooting events, shooting time, author and the organizations or relations in of the author in a social community or organization), or static attributes (e.g., predefined group logical based on access account or Internet address range). In an alternative embodiment, the content identifying table of the content identifying labels and tables 295 can further include the weighting factors used by the stream content analysis unit 210 as shown in Table 1, and the score table of the content importance (e.g., the event types and the weights of the event types) as shown in Table 2. In further examples, after obtaining the identifying labels of the content identifying labels and tables 295, the client player can further query groups, categories, attributes and event analysis results of the streaming content from the table of the content identifying labels and tables 295. Specifically, but not limited to such examples, the identifying labels and content identifying tables of 295 can be transmitted through the RTP header extension and the Real-time Transport Control Protocol (RTCP) packet respectively.

The extracted source streaming contents are transmitted to one or plurality of the decoder unit instances 530 to decode the source streaming contents. In some certain embodiments, each extracted source stream is dispatched to a decoder unit instance 530 respectively to decode the source streaming contents simultaneously. The videos of the different source streaming contents, after being decoded by the decoder unit instances 530, can be rendered onto different divided areas in the multiple-divided area video rendering unit 555, wherein for each divided rendering area there is an independent render instance to provide a separated viewport. More specifically, but not limited to such examples, the divided areas in this embodiment can render different videos at the same time by separating a graphical user interface (GUI) area.

In an alternative embodiment, all the extracted source streaming contents are decoded by a single decoder unit instance 530 because of the restrictions of the client player 150.

In some certain embodiments, because of the restricted capability of the single-area video rendering unit 550 and the multiple-divided-area video rendering unit 555, the videos decoded by the decoder unit instances can be displayed in the single-area video rendering unit 550 sequentially according to the timestamps adjusted by the frame timestamp adjust unit 230 in the stream condense unit 100. In this embodiment, the presentation manner of displaying each input source streaming content is similar to displaying a single video stream. However, the frames from different source streaming contents are switched and displayed in turns.

In some embodiments, when the videos are displayed, the extracted content identifying labels of 295 can be displayed with the videos so that the user can know the source streaming contents that the currently displayed frame belongs to. In some embodiments, the content identifying labels and tables can be in a format that is easy for the user to read so that the user can know the sources of the currently condensed stream. In another embodiment, the content identifying labels and tables can be used as input data for requesting the source streaming contents.

The content request unit 540 can take the content identifying labels and table 295 extracted by the condensed stream extract unit 520 from the condensed stream as the input. The user can issue some stream composition adjust request 161 to the client request handler 260 in the stream condense unit 100 according to his/her interests or the demands to request the stream condense unit 100 for a certain source streaming content in the condensed stream associated with the identifiers from the content identifying labels and tables 295 which are extracted and sent along with the stream composition adjust request 161. Further illustrating, because the stream condense unit 100 generates the content identifying labels and tables 295 for the streams in each streaming content group (the content identifying labels and tables extracted by the client player is sent from the stream condense unit 100), the user can request a certain source streaming content with the identifiers of the content identifying labels and tables 295. In an embodiment, the stream composition adjust request 161 can be used to request some certain source streaming content corresponding to the input request to have a higher or lower weighting factor when the stream content analysis unit 210 analyzes all the input streams so that the stream content analysis unit 210 can increase or reduce the composition ratio in the condensed stream for that source streaming content requested by the client request unit 540.

In an alternative embodiment, the stream composition adjust request 161 can also be used to request an adjustment of the weighting factor of some certain events when the stream content analysis unit 210 calculates the importance scores so that the stream content analysis unit 210 can adjust the composition ratio of some certain events in the condensed stream.

In another embodiment, the client player 150 can request the streaming server 110 to transmit an original source streaming content corresponding to the content identifying label to the streaming data receive unit directly through a client source request 170. Then, the client player 150 receives and displays the original source streaming content without condensation process by the stream condense unit 100.

When a source streaming content is newly added in or removed from the stream condense unit 100, the streaming output unit 240 informs the client player of the changes in the source streaming contents composed in the condensed stream by sending the updated content identifying labels and tables 295. When receiving the updated content identifying labels and table, the condensed stream extract unit 520 can adjust the allocation of resources of the client player 150 according to the change of the updated content identifying labels and tables. Specifically, but not limited to such an embodiment, when the client player 150 finds that there are new input source streaming contents, new plurality of instances will be increased in decoder unit instances 530 if the resource of the client player is still enough. The multiple-divided-area video rendering unit 555 also allocates a new area in the divided layout to display the newly added source streaming content. If the client player 150 finds that certain source streaming content is removed from the input streaming content group, the condensed stream extract unit 520 can release the resources which originally assigned to decode and render the source streaming content.

In some embodiments, the client player could be coupled to plurality of condense units and/or streaming servers at the same time. In this case, the client player could request for plurality of condensed streams 165 and direct-single streams 195 at the same time. Based on the capabilities of the embodiments, decoding and rendering the streams is achieved either in turn or simultaneously if the resource is available.

Figure 10:
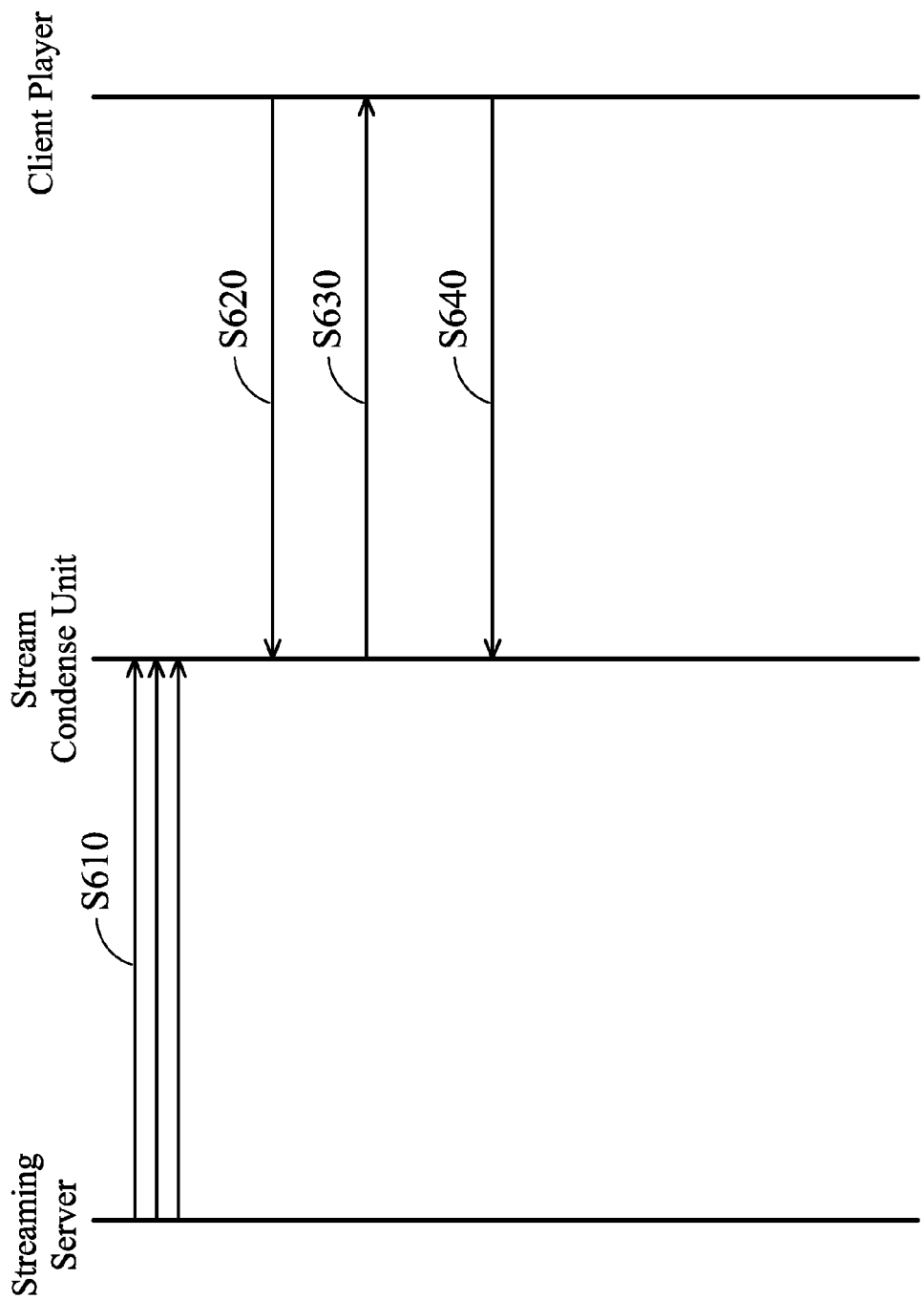
FIG. 10 is a flow chart illustrating a connection process between the streaming server, the stream condense unit and the client player according to an embodiment of the present disclosure.

FIG. 10 is a flow chart illustrating a connection process between the streaming server, the stream condense unit and the client player according to an embodiment of the present disclosure. Please refer to FIG. 2 and FIG. 10, first, in step S610, the streaming server 110 sends multiple source streaming contents that belong to the same input streaming content group to the stream condense unit 100 in a grouped manner. Then, in step S620, the client player 150 can send a request for a condensed stream of a certain input streaming content group to the stream condense unit 100.

If the input streaming content group requested by the client player 150 is existed and valid, in step S630, the stream condense unit 100 sends the condensed stream of the input streaming content group to the client player 150.

When receiving and playing the condensed stream, in step S640, the client player 150 can request to increase or decrease the composition proportion of specific source streaming content that interests the client by transmitting a stream composition adjust request 161 for the specific source streaming content in the condensed stream. In some embodiments, the request can also indicate that the proportion of some certain events in the condensed stream should be adjusted.

Figure 11:
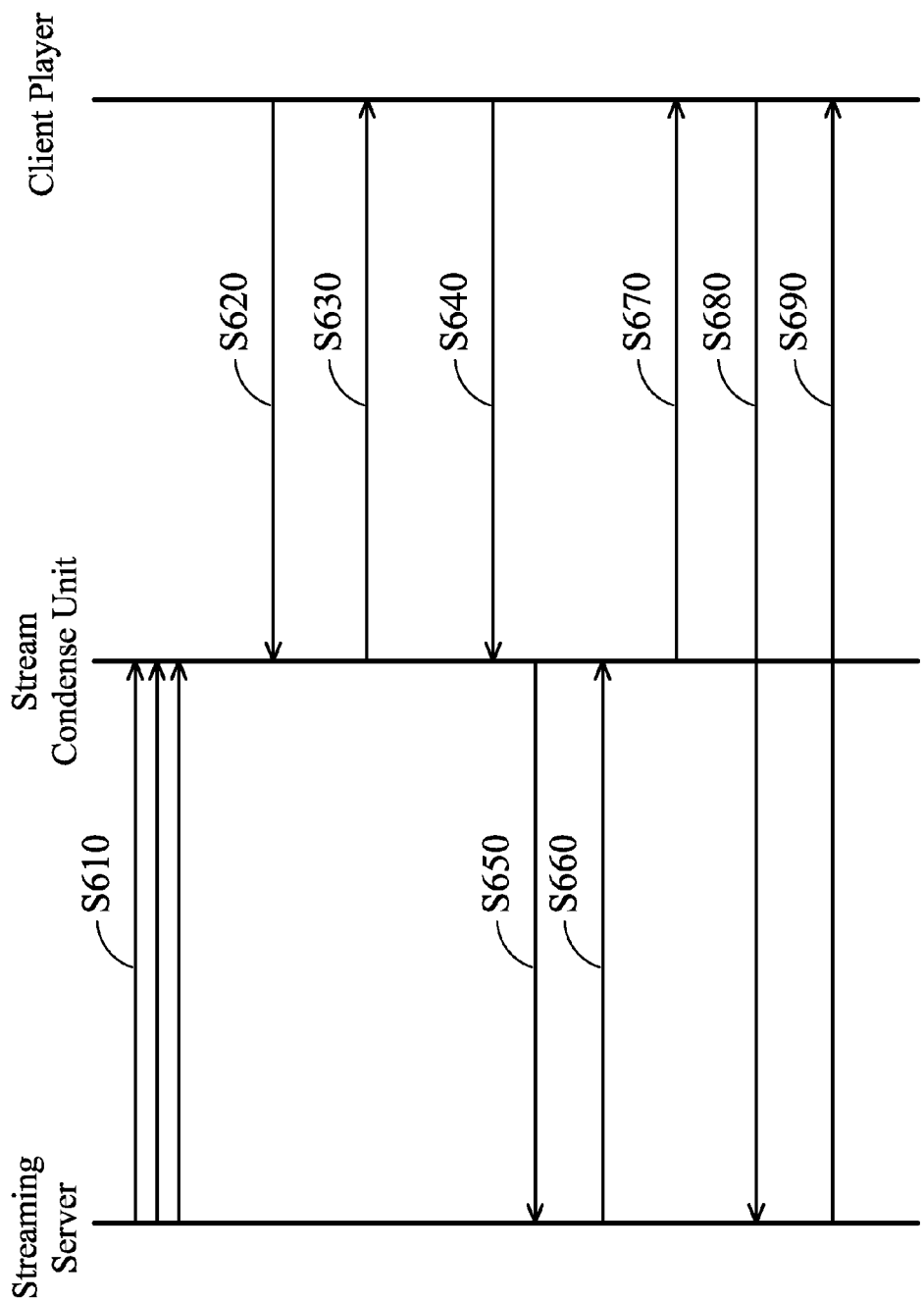
FIG. 11 is a flow chart illustrating a connection process between the streaming server, the stream condense unit and the client player according to an embodiment of the present disclosure.

FIG. 11 is a flow chart illustrating a connection process between the streaming server, the stream condense unit and the client player according to an embodiment of the present disclosure. Please refer to FIG. 2 and FIG. 11, first, in step S610, the streaming server 110 sends multiple source streaming contents that belong to the same input streaming content group to the stream condense unit 100 in a grouped manner. Then, in step S620, the client player 150 can send a request for a condensed stream of a certain input streaming content group to the stream condense unit 100.

If the input streaming content group requested by the client player 150 is existed and valid, in step S630, the stream condense unit 100 sends the condensed stream of the input streaming content group to the client player 150.

When receiving and playing the condensed stream, in step S640, the client player 150 can apply a client source request 170 to request the original stream of some certain source streaming contents, which are not processed by the stream condense unit 100.

In step S650, the stream condense unit 100, which acts as a proxy, sends a forwarded client source request 175 used to query the source streaming content to the streaming server 110 according to the client source request 170 sent from the client player 150.

After receiving the forwarded client source request 175 sent from the stream condense unit 100, in step S660, the streaming server 110 responds a server-response message 180 used to indicate the location and the connection mode for connecting with the source streaming content queried by the stream condense unit 100. Specifically, but not limited to such examples, the location and the connection mode can be a complete Real-Time Streaming Protocol Uniform Resource Identifier (RTSP URI), such as rtsp://123.4.5.6:554/live_source.

In step S670, the stream condense unit 100 responds a forwarded server-response message 185, which forwards the results in the server-response message 180 just transmitted by the streaming server 110 in step S660, to the client player 150.

After receiving the forwarded server-response message 185 transmitted by the stream condense unit 100, in step S680, the client player 150 sends a session request 190 to request that the streaming server 110 to establish a connection session directly to the streaming server according to the location and the connecting mode specified in the forwarded server-response message 180.

The streaming server 110 examines the session request 190. If the session request 190 is valid, in step S690, the streaming server 110 establishes the connection session and streams the direct-single streaming 195 to the client player 150.

Figure 12A:
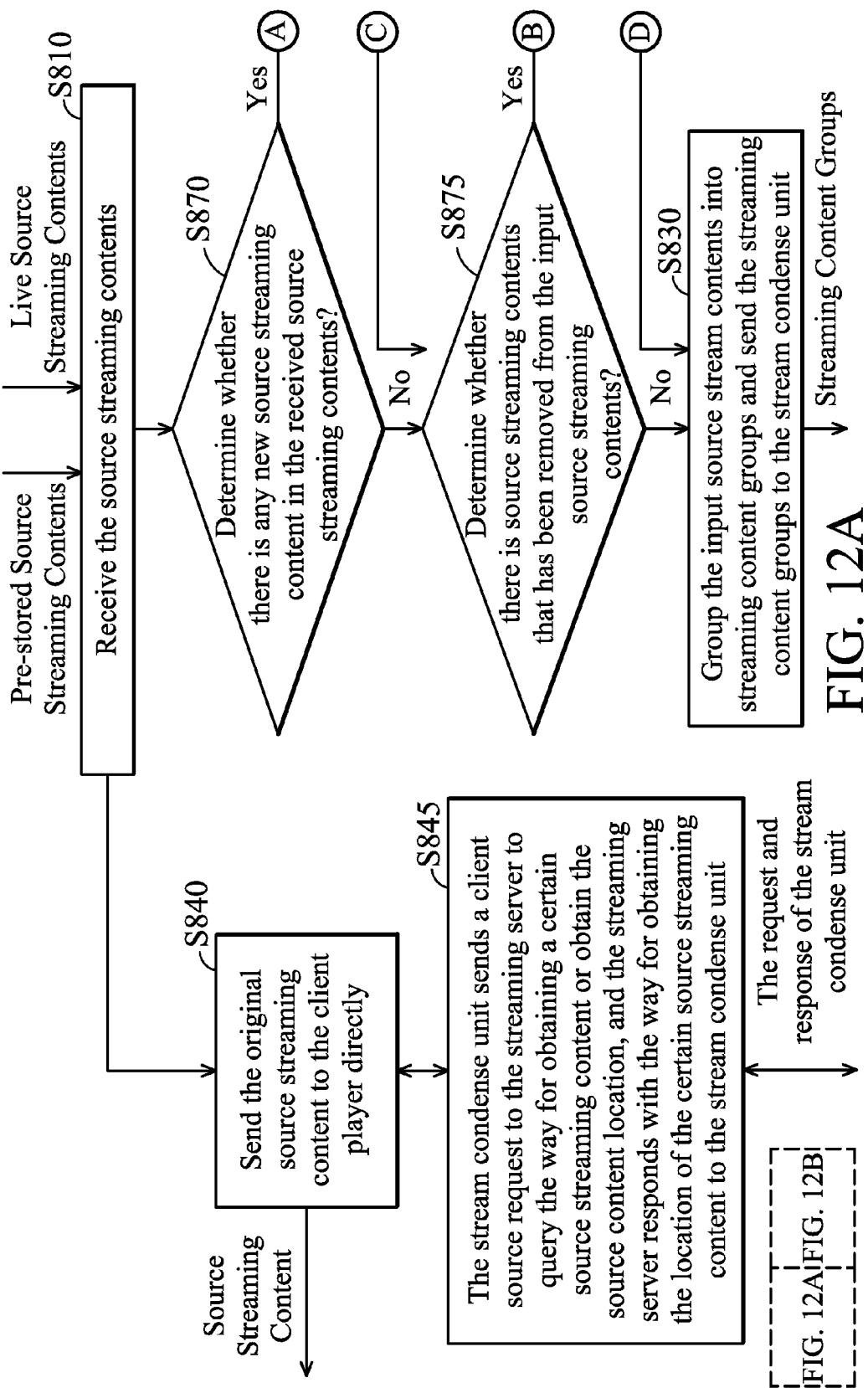
FIGS. 12A~12B are flow diagrams illustrating that the inputted source streaming contents are grouped and transmitted by the streaming server according to an embodiment of the present disclosure.
Figure 12B:
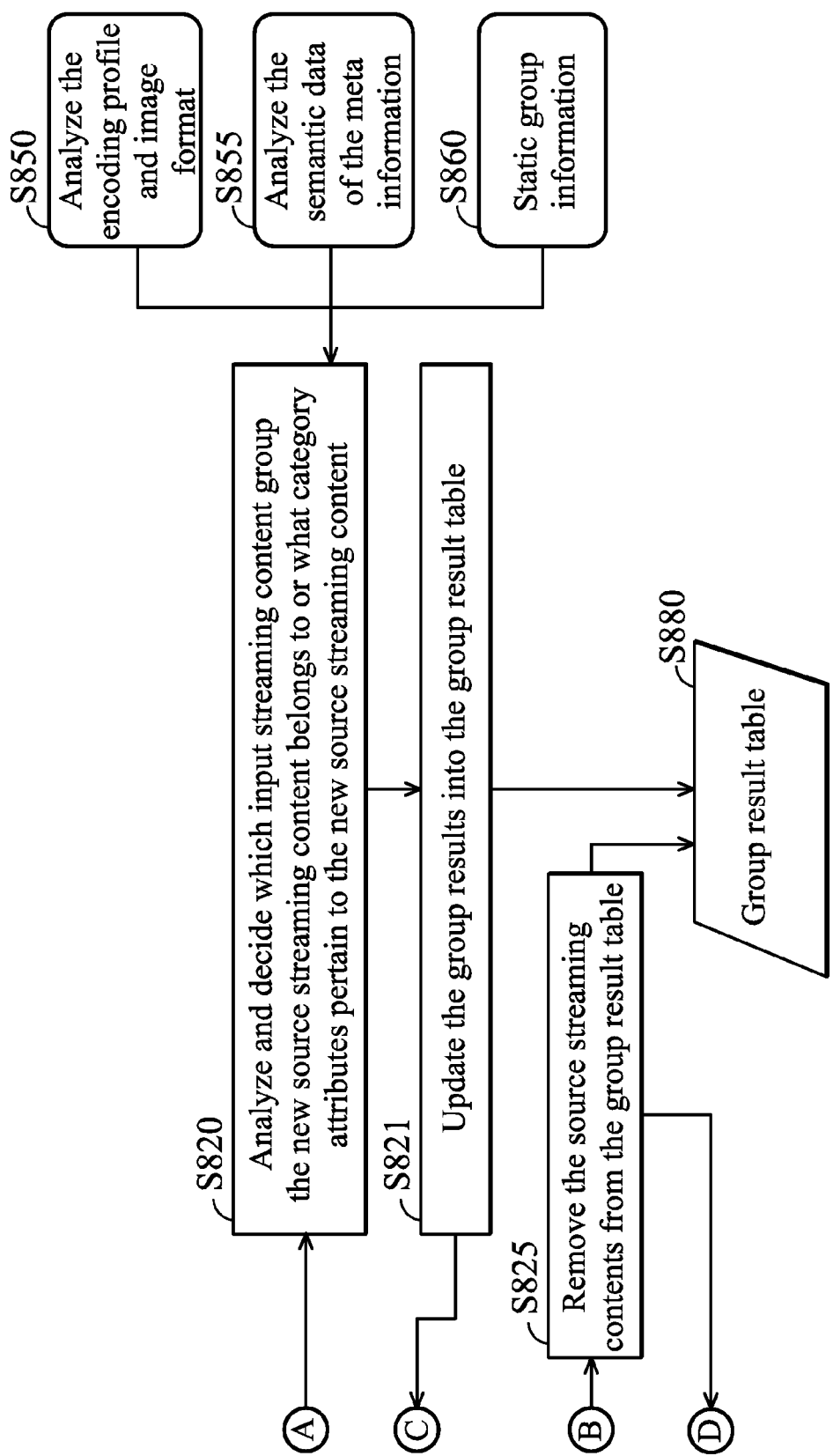

FIGS. 12A~12B are flow diagrams illustrating how the inputted source streaming contents are grouped and transmitted by the streaming server 110 according to an embodiment of the present disclosure. Please refer to FIG. 8 and FIGS. 12A~12B. First of all, in step S810, the source content input unit 410, which is in the streaming server 110, receives the live source streaming contents 120 and the pre-stored source streaming contents 130. Then, in step S870, the source content input unit 410 determines whether there is any newly added source streaming content in the received source streaming contents.

When there is any new source streaming content in the received source streaming contents ("Yes" in step S870), in step S820, the content grouping unit 420 analyzes and decides which input streaming content group the new source streaming content belongs to or what category attributes pertain to the new source streaming content. In different embodiments, the content grouping unit 420 can analyze the received source streaming contents by analyzing the encoding profile and image format (step S850), analyzing the semantic data of the meta information (step S855) or analyzing according to the static group information (step S860). In step S880, the analysis result can be updated in the group result table 465 through step S821. In some embodiments, step S820 can also assign some certain source streaming contents to a new group by examining the source streaming content that has already been in another group. For example, a source streaming content originally belongs to a group XXX (geometrical location in a region XXX) may be assigned to another group YYY (geometrical location in a region YYY) by examining the geometrical location attribute in step S820 if the location of the source streaming content has moved to the region YYY. The group results are then updated into the group result table through step S821.

After examining for newly added source streaming content in step S870 or after deciding the input streaming content group in step S820, in step S875, the content grouping unit 420 determines whether there is a source streaming content that has been removed from the input streaming content groups, or the connection session is broken and the transmission is stopped. When the either of the above condition is true ("Yes" in step S875), in step S880, the source streaming contents can be removed from the group result table 465 through step S825. Finally, in step S830, the content grouping unit 420 groups the input source streaming contents and sends to the source content group output unit 430 according to the group results in the group result table 465. Then, the source content group output unit 430 sends the streaming content groups to the stream condense unit 100.

After updating the group result table by examining the source streaming contents which are newly added, removed or stopped receiving, the received source streaming contents are processed with step S830. In step S830, the content grouping unit 420 groups the input source streaming content contents into plurality of input streaming content groups and sends these input streaming content groups to the source content group output unit 430 directly according to the group result table 465. Then, the source content group output unit 430 sends each input streaming content group in a grouped manner to the stream condense unit 100.

In addition, when the source streaming contents are received by the streaming server 110 in step S810, in step S840, the streaming server 110 may also send the original source streaming contents to the client player 150 directly. In step S845, the client player 150 can send a client source request 170 to the stream condense unit, which forwards the forwarded client source request 175 to the streaming server 110 to query the way for obtaining a certain source streaming content. If the request is permitted, the location of the source streaming content used in step S840 is replied in the server-response message 180 to the stream condense unit, which later forwards the forwarded server-response message 185 to the client player 150 and finally the client player 150 can obtain the original source streaming content from the streaming server 110 through step S840.

Figure 13A:
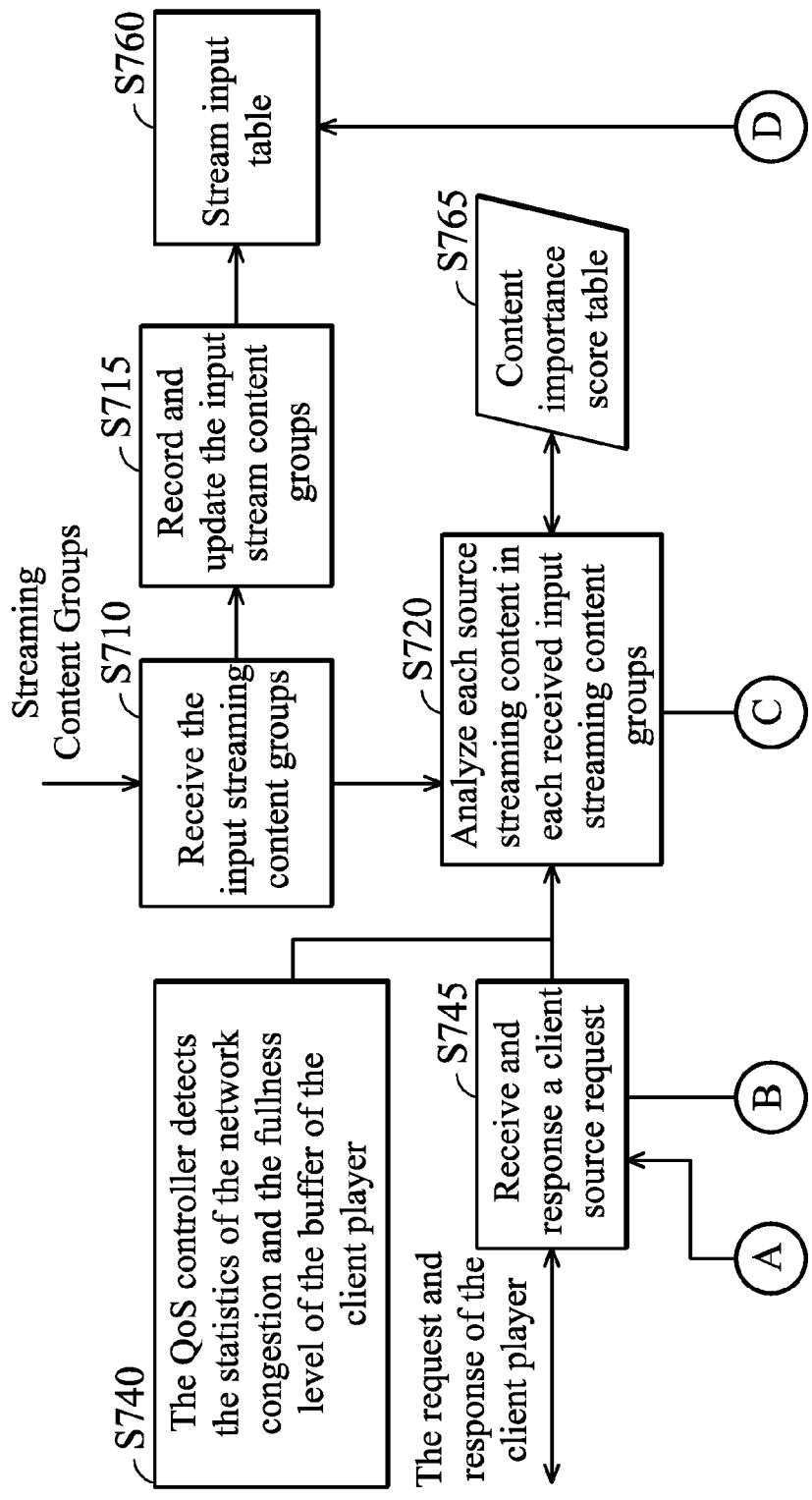
FIGS. 13A~13B are flow diagrams illustrating that the condensed stream is generated in the stream condense unit according to an embodiment of the present disclosure.
Figure 13B:
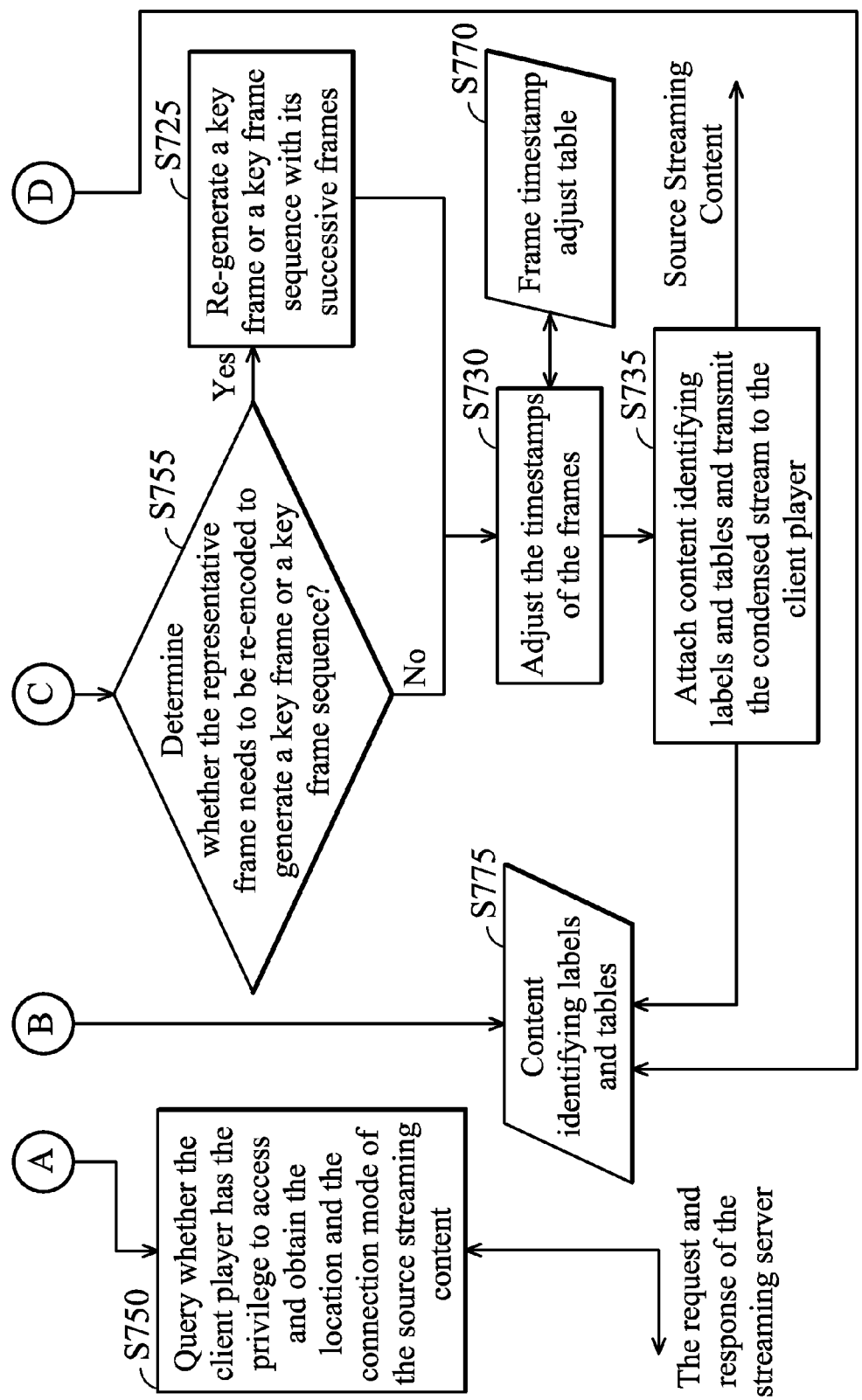

FIGS. 13A~13B are flow diagrams illustrating that the condensed stream is generated in the stream condense unit 100 according to an embodiment of the present disclosure. Please refer to FIG. 4 and FIGS. 13A~13B.

First, in step S710, the streaming data input unit 220 which is in the stream condense unit 100 receives the input streaming content groups grouped by the streaming server 110. Then, in step S715, the streaming data input unit 220 records and updates the stream input table 270 (step S760) based on the received input streaming content groups.

In step S720, the stream content analysis unit 210 analyzes each source streaming content in each received input streaming content group. In different embodiments not limited to this example, the analysis method can be detecting the change of content among frames (i.e. motion detection), object detections, face detections or license plate detections and so on. The analysis method can also be detecting the source streaming content according to the amount of data accumulated or time intervals when no special events are detected. According to the analyzed events and contents, the stream content analysis unit 210 analyzes the inputted content of each stream source and computes the importance scores. Then, the stream content analysis unit 210 stores the importance scores in the content importance score table 275 (step S765) for continuously keeping track of the analyzed events and contents. For the embodiments that use pixel-level analysis methods, those analysis methods may perform decoding process to convert the compressed bitstream into pixel-level images in desired colorspace. During the analysis, the frames within a period of time from each inputted source streaming content may be hold in a buffer for later outputting of representative frame sequence. In different embodiment, the period of time could be a few seconds, a certain number of frames or a certain number of GOPs.

When the importance score of a certain source streaming content satisfies a certain condition, the certain source content is selected and outputted to the condensed stream. In some embodiments, the key-frame sequence generate unit 290 can determine whether the representative frame or frames, which is going to be outputted to the condensed stream, needs to be re-encoded to generate a key frame or a key frame sequence in step S755. When the key-frame sequence generate unit 290 needs to re-generate a key frame or a key frame sequence ("Yes" in step S755), in step S725, the representative frame is re-encoded in an intra-coded way to generate a key frame. The key frame with/without the re-encoded successive frames are outputted to the stream condense unit 100.

In some embodiments, the key-frame sequence generate unit 290 can output the neighboring key frame with/without the successive frames to the condensed stream directly without examining whether the representative frame is a key frame and regenerating a key frame or a key frame sequence.

In step S730, the frame timestamp adjust unit 230 adjusts the timing order by adjusting the timestamps of the frames originated from different source contents in the selected condensed stream so that the client player 150 in some certain embodiments can play the condensed stream in the desired time order properly according to the timestamps adjusted by the frame timestamp adjust unit 230. In step S770, the frame timestamp adjust unit 230 records the timestamps in a frame timestamp adjust table 280.

In some certain embodiments, in step S730, to have better human perceptual effect, the rendering time, or the time ratio of the frames presented of the video sequence from some certain source streaming contents can be adjusted by adjusting the timestamp in of those frames in the frame timestamp adjust unit 230.

Then, in step S735, the streaming data output unit 240 attaches content identifying labels and tables 295 which are used to identify the different source streaming contents to the condensed stream, which has been finished timestamp adjustment, and transmits the condensed stream to the client player. The content identifying labels or tables used in the condensed stream are recorded in the content identifying labels and tables 295 (step S775).

In addition, in step S740, the quality of service controller 250 can detect the statistics of the network congestion and the fullness level of the buffer of the client player 150 to control the condensation level, which will affect the stream content analysis unit 210 when it analyzes and condenses the input streaming contents in step S720.

Furthermore, in step S745, the client request handler 260 in the stream condense unit 100 receives stream composition adjust requests 161 and client source requests 170 identified with the identifiers from the content identifying labels and tables for a certain source streaming content from the client player 150. When receiving the stream composition adjust requests 161 or client source request 170, the client request handler 260 queries the content identifying labels and tables 295 in the step S775 with the identifying labels and tables indicated by the client source request and compares the stream input table 270 (step S760) to obtain the source and the information of the source streaming content requested by the client player 150.

In some certain embodiments, according to the stream composition adjust request 161, the stream content analysis unit 210 increases or decreases the weights or the conditional thresholds of the importance scores of some certain sources so that source streaming content in S720 the composition proportion of some certain source streaming content in the condensed stream can be changed temporarily or permanently.

In some embodiments, the stream content analysis unit 210 can also increase or decrease the weights of the importance scores used for some certain events in step S720, according to the stream composition adjust requests 161, the composition proportion of some certain events can be changed source streaming content temporarily or permanently.

In an alternative embodiment, the client request handler 260 queries and compares the source content information recorded in the stream input table 270 (step S760) with the content identifying labels and tables (step S775) when receiving client source request 170. In step S750, the streaming data input unit 220 transmits a forwarded client source request 175 to the streaming server 110 to query whether the client player 150 has the privilege to access and obtain the location and the connection mode of the source streaming content from the streaming server 110 directly and receives a server-response message 180 transmitted from the streaming server 110. The response message transmitted from the streaming server 110 can be forwarded to the client player with the forwarded server-response message 185 through the process in step S745.

Figure 14A:
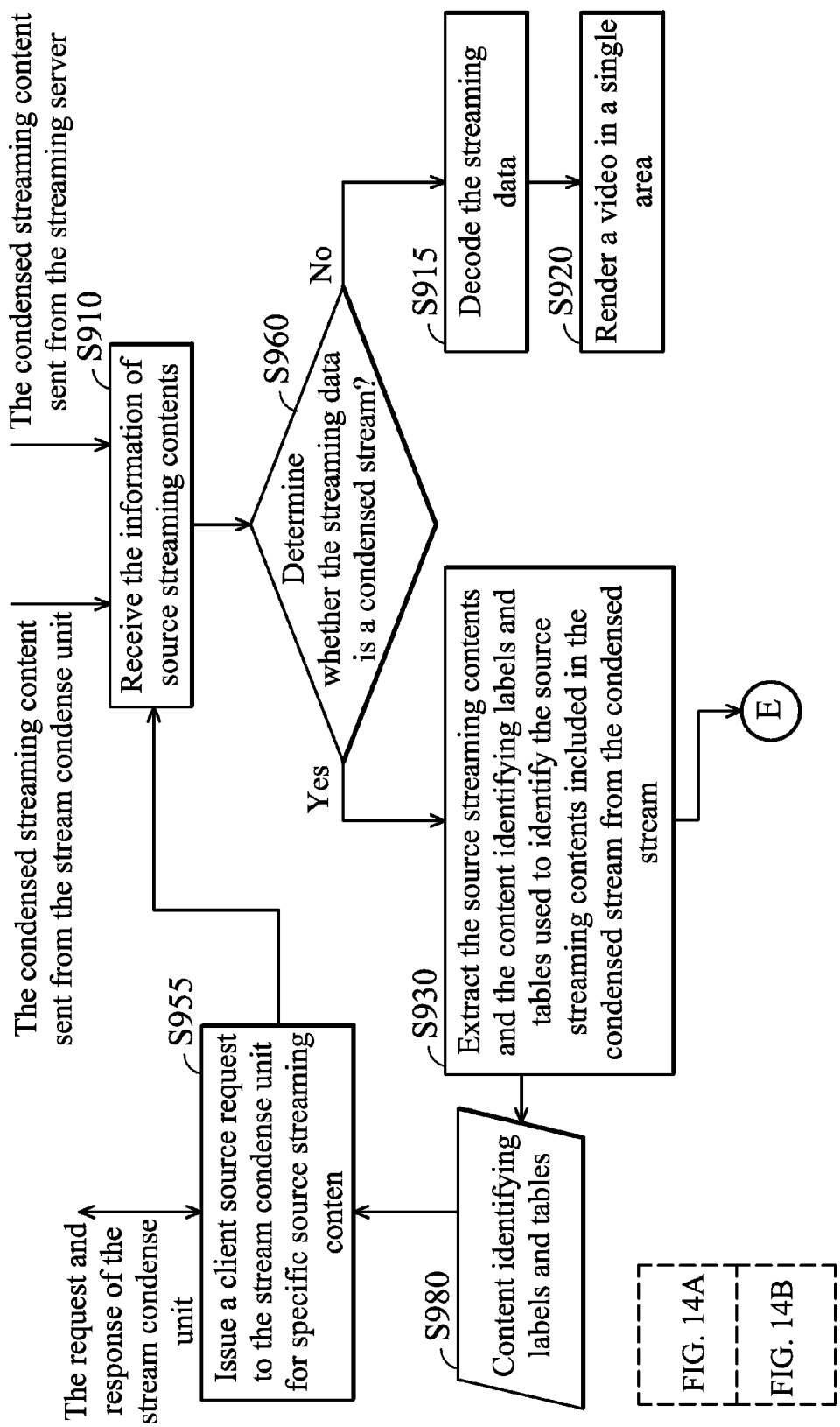
FIGS. 14A~14B are flow diagrams illustrating that the condensed stream is received, processed and played in the client player according to an embodiment of the present disclosure.
Figure 14B:
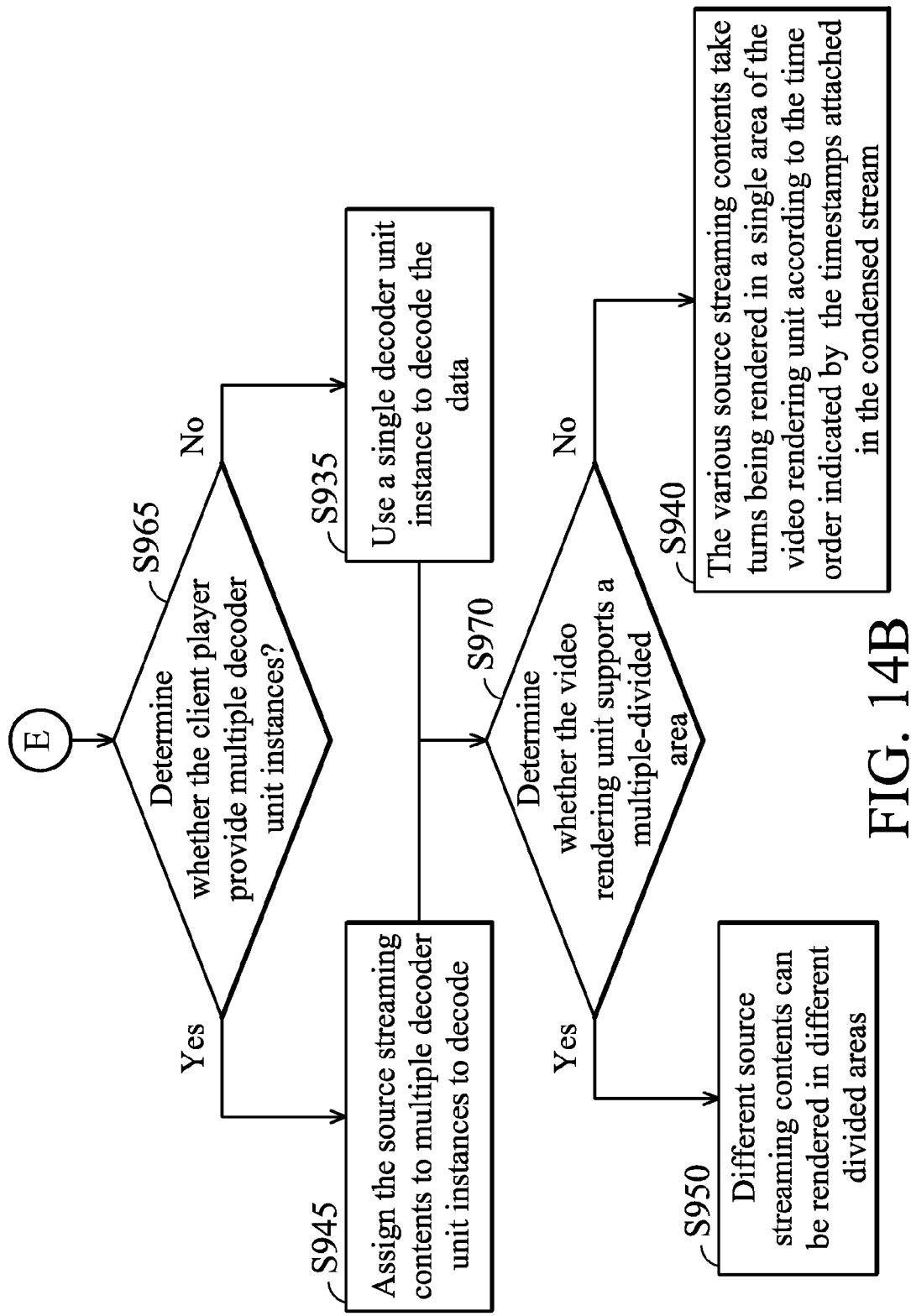

FIGS. 14A~14B are flow diagrams illustrating that the condensed stream is received, processed and played in the client player 150 according to an embodiment of the present disclosure. Please refer to FIG. 9 and FIGS. 14A~14B.

First, in step S910, the streaming data receive unit 510 in the client player 150 can receive the information of source streaming contents from the streaming server 110 directly, and also receive the condensed stream from the stream condense unit 100.

In step S960, after receiving the streaming data, the streaming data receive unit 510 determines whether the streaming data is a condensed stream. If the streaming data is not a condensed stream ("No" in step S960), in step S915, the decoder unit instance 530 decodes the streaming data. Finally, in step S920, the single-area video rendering unit 550 renders a video in a single area.

If the streaming data is a condensed stream ("Yes" in step S960), in step S930, the condensed stream extract unit 520 extracts the source streaming contents and the content identifying labels and tables used to identify the source streaming contents included in the condensed stream from the condensed stream.

After extracting the source streaming contents, in step S965, the condensed stream extract unit 520 determines whether the client player 150 can provide multiple decoder unit instances. In some embodiments, when the client player 150 can not provide multiple decoder unit instances because of resource constraints, in step S935, the client player 150 can use a single decoder unit instance 530 to decode the data. In some embodiments, when the client player 150 can provide multiple decoder unit instances 530, in step S945, the condensed stream extract unit 520 dispatches each source streaming content to different instance in the decoder unit instances 530 to decode.

Next, in step S970, the decoder unit instance 530 determines whether the video rendering unit supports a multiple-divided area for rendering the video. In some embodiments, if the client player 150 can not provide a multiple-divided area to render the video because of resource constraints, in step S940, the various source streaming contents take turns being rendered in a single area video rendering unit according to the time order indicated by the timestamps attached in the condensed stream. In some embodiments, if the client player 150 can provide a multiple-divided area to render the video, in step S950, different source streaming contents can be rendered in different divided areas.

If the user of the client player 150 is interested in some specific or certain source streaming contents, the user can issue a stream composition adjust request 161 or a client source request 170 to the stream condense unit 100 for specific source streaming content in step S955 according to the identifying labels and tables (step S980) relating to the sources that interest the user.

For the client requesting specific source streaming content, in some embodiments, the stream composition adjust request 161 can be used to increase or decrease (temporarily or permanently) the ratio of the specific source streaming content in the condensed stream.

In some embodiments, the stream composition adjust request 161 can also be used to increase or decrease (temporarily or permanently) the ratio of a certain events in the condensed stream.

In these embodiments, the disclosed methods can reduce the time and resources consumed in re-establishing a new session.

In some embodiments, the client player 150 can issue a client source request 170 directly to the stream condense unit 100 for querying the streaming server 110 about directly transmitting a source streaming content originating from a certain source. If the stream condense unit 100 can obtain the source stream of the certain source from the streaming server 110 content originating from that certain source, in step S955, the stream condense unit 100 can receive the way, in the server-response message 180, for obtaining the location for the connection to the source streaming content originating from the source (for example, but not limited to, the Real-Time Streaming Protocol Uniform Resource Identifier (RTSP URI)) and then forward the location for connection in the forwarded server-response message 185 to the client player 150. In step S910, the client player 150 can connect and receive the original source streaming content of a certain source from the streaming server 110. In this embodiment, the client player 150 can obtain source streaming content that is not condensed by the stream condense unit 100 to retain the complete original streaming data.

It is noted that the streaming server, the stream condense unit, and the client player described above in this disclosure are separate components of the system, but these components can be integrated to reduce the number of components in the system. Similarly, one or more components can be used separately to increase the number of components in the system.

Therefore, a plurality of source streaming contents can be condensed and multiplexed in a single session according to the content events or the interest of the user through the method and system for generating the condensed stream in this disclosure. In the transmission process, the ratio and condensed level of the condensed stream can be changed to meet the different needs of each receiving-end device according to the capabilities and network conditions of the client-side devices. After receiving the condensed stream, the client player can render and adjust the condensed stream in different rendering manners. In addition, many advantages can be achieved by using the system and method in this disclosure: (1) decreasing the waiting time for the user to view multiple streaming contents and providing the user with global channel preview to understand the highlights in each source streaming content; (2) the stream condense unit can adjust the contents in the condensed stream automatically and dynamically according to the capabilities and network conditions of the client-side devices to improve the perceptual experience of viewing the condensed stream; (3) the user can use less bandwidth but view more contents at the same time, and provide a proper presentation according to the received condensed stream. Therefore, utilizing a combination of the above advantages, the network streaming applications used in this disclosure provide great advantages for viewing multiple video source streaming contents.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stream condense unit, coupled to a streaming server and a client player, comprising:
   at least one processor coupled to a memory;
   a streaming data input unit, configured to receive a plurality of streaming content groups sent by the streaming server and record entries of a plurality of source streaming contents in each streaming content group into a stream input table;
   a stream content analysis unit, configured to receive the plurality of streaming content groups sent by the streaming data input unit, execute a content analysis to get importance scores of the plurality of source streaming contents in each streaming content group and generate and output a condensed stream for each streaming content group, wherein the stream content analysis unit stores the content analysis and the importance scores into a content importance score table, and wherein the stream content analysis unit further comprises:
      a key-frame sequence generate unit, configured to use intra-coding to re-encode a representative frame of the condensed stream generated by the stream content analysis unit to an intra-coded key frame and generate a new key frame sequence when the representative frame is not a key frame;
   a frame timestamp adjust unit, configured to receive the condensed stream sent by the stream content analysis unit and adjust a timestamp of each frame in the condensed stream, wherein the timestamps are recorded in a frame timestamp adjust table; and
   a streaming data output unit, configured to receive the condensed stream sent by the frame timestamp adjust unit and attach content identifying labels and tables to the condensed stream, and send the condensed stream to the client player to display; and
   wherein the streaming data input unit, the stream content analysis unit, the frame timestamp adjust unit, and the streaming data output unit are stored on the memory and executed by the processor.

2. The stream condense unit as claimed in claim 1, further comprising:
   a quality of service controller, configured to detect a congestion status of the network between the stream condense unit and the client player and feeds back estimated results to the stream content analysis unit; and
   a client request handler, configured to receive a client source request sent by the client player; the client request handler queries the stream input table through the data input unit and sends the requested source streaming contents to the client player.

3. The stream condense unit as claimed in claim 1, wherein the content analysis is used to determine the importance of the plurality of streaming content groups by detecting types of events, weights, and weighting factors of the plurality of streaming content groups.

4. A system for generating a condensed stream, coupled to a client player, comprising:
   a streaming server, comprising:
      at least one first processor coupled to a first memory;
      a source content input unit, configured to receive a plurality of source streaming contents;

a content grouping unit, coupled to the source content input unit, configured to receive the plurality of source streaming contents sent by the source content input unit and group the plurality of source streaming contents into a plurality of streaming content groups according to some attributes; and a source content group output unit, coupled to the content grouping unit and configured to receive the plurality of streaming content groups sent by the content grouping unit and send the plurality of streaming content groups in a grouped manner to a stream condense unit, wherein the source content input unit, the content grouping unit, and the source content group output unit are stored on the first memory and executed by the first processor; and the stream condense unit, coupled to the streaming server and the client, comprising:

at least a second processor coupled to a second memory;

a streaming data input unit, configured to receive the plurality of streaming content groups sent by the streaming server and record entries of a plurality of source streaming contents in each streaming content group into a stream input table;

a stream content analysis unit, configured to receive the plurality of streaming content groups sent by the streaming data input unit, execute a content analysis to get importance scores of the plurality of source streaming contents and generate and output a condensed stream for each group, wherein the stream content analysis unit stores the content analysis and the importance scores into a content importance score table, and wherein the stream content analysis unit further comprises:

a key-frame sequence generate unit, configured to use intra-coding to re-encode a representative frame of the condensed stream generated by the stream content analysis unit to an intra-coded key frame and generate a new key frame sequence when the representative frame is not a key frame;

a frame timestamp adjust unit, configured to receive the condensed stream sent by the stream content analysis unit and adjust a timestamp of each frame in the condensed stream, wherein the timestamps are recorded in a frame timestamp adjust table; and a streaming data output unit, configured to receive the condensed stream sent by the frame timestamp adjust unit and attach content identifying labels and tables to the condensed stream, and send the condensed stream to the client player to display, and wherein the streaming data input unit, the stream content analysis unit, the frame timestamp adjust unit, and the streaming data output unit are stored on the second memory and executed by the second processor.

5. The system for generating a condensed stream as claimed in claim 4, wherein the content analysis is used to determine the importance of the plurality of streaming content groups by detecting types of events, weights, and weighting factors of the plurality of streaming content groups.

6. The system for generating a condensed stream as claimed in claim 4, wherein the content grouping unit further comprises:

an encoding profile analyzer, configured to classify the plurality of source streaming contents into the plurality of streaming content groups according to some encoding attributes.

7. The system for generating a condensed stream as claimed in claim 4, wherein the content grouping unit further comprises:

a semantic group analyzer, configured to classify the plurality of source streaming contents into the plurality of streaming content groups according to some semantic attributes.

8. The system for generating a condensed stream as claimed in claim 4, wherein the content grouping unit further comprises:

a static group table, configured to classify the plurality of source streaming contents into the plurality of streaming content groups according to a static definition or classification.

9. The system for generating a condensed stream as claimed in claim 4, wherein the streaming server further comprises:

a group result table, coupled to the content grouping unit and the source content group output unit and configured to record grouping results which specify what input streaming content group each source streaming content belongs to.

10. The system for generating a condensed stream as claimed in claim 4, wherein the stream condense unit further comprises:

a quality of service controller, configured to detect a congestion status of the network between the stream condense unit and the client player, feeds back estimated results to the stream content analysis unit; and a client request handler, configured to receive a stream composition adjust request or a client source request sent by the client player; on receiving the stream composition adjust request, the client request handler sends a signal to the stream content analysis unit to indicate adjusting a weight of a certain source streaming content or weighting factor of some certain events to change a composition of the condensed stream temporarily or permanently; on receiving the client source request, the client request handler queries the stream input table through the streaming data input unit, forwards the request to the streaming server, receives a server response and responses a location of the requested source streaming contents to the client player.

11. A method for providing and transmitting a condensed stream, wherein the method is used in a stream condense unit, wherein the stream condense unit is coupled to a streaming server and a client player, comprising:

receiving, by a streaming data input unit, a plurality of streaming content groups;

recording, by the streaming data input unit, entries of a plurality of source streaming contents in each streaming content group into a stream input table;

executing, by a stream content analysis unit, a content analysis to get importance scores of source streaming contents;

storing, by the stream content analysis unit, the content analysis and the importance scores into a content importance score table;

generating and outputting, by the stream content analysis unit, a condensed stream for each group;

determining, by a key-frame sequence generate unit of the stream content analysis unit, whether a representative frame of the condensed stream is a key frame; and using intra-coding to re-encode, by the key-frame sequence generate unit, the representative frame of the condensed stream generated by the stream content analysis unit to an intra-coded key frame and generate a new key frame sequence when the representative frame is not a key frame;

adjusting, by a frame timestamp adjust unit, a timestamp of each frame in the condensed stream and recording the timestamps in a frame timestamp adjust table;

attaching, by a streaming data output unit, content identifying labels and tables to the condensed stream; and transmitting, by the streaming data output unit, the condensed stream to the client player to display.

12. The method for providing and transmitting a condensed stream as claimed in claim 11, further comprising:

detecting, by a quality of service controller, a congestion status of the network between the stream condense unit and the client player and feeding back estimated results to the stream content analysis unit;

receiving, by a client request handler, a stream composition adjust request sent by the client player;

adjusting, by the stream content analysis unit, a weight of a certain source streaming content indicated by the content identifying labels and tables to increase or decrease a composition proportion of the source streaming content temporarily or permanently on receiving a first stream composition adjust request; and adjusting, by the stream content analysis unit, the weighting factor of a certain event indicated by the content identifying labels and tables to increase or decrease a composition proportion of the event temporarily or permanently on receiving a second stream composition adjust request.

13. The method for providing and transmitting a condensed stream as claimed in claim 11, further comprising:

detecting, by a quality of service controller, a congestion status of the network between the stream condense unit and the client player and feeding back estimated results to the stream content analysis unit;

receiving, by a client request handler, a client source request sent by the client player; and transmitting, by the client request handler, the client source request for querying a source streaming contents that the client player requested to the streaming server by querying the stream input table.

14. The method for providing and transmitting a condensed stream as claimed in claim 11, wherein the content analysis is used to determine the importance of the plurality of streaming content groups by detecting types of events, weights, and weighting factors of the plurality of streaming content groups.

15. A method for providing and transmitting a condensed stream, the method being used in a system for providing and transmitting a condensed stream, wherein the system includes a streaming server, a stream condense unit and a client player, comprising:

receiving, by a source content input unit, a plurality of source streaming contents;

grouping, by a content grouping unit, the plurality of source streaming contents into a plurality of streaming content groups according to some attributes;

recording, by a streaming data input unit, source streaming contents of the plurality of streaming content groups into a stream input table;

executing, by a stream content analysis unit, a content analysis to get importance scores of the source streaming contents;

storing, by the stream content analysis unit, the content analysis and the importance scores into a content importance score table;

generating and outputting, by the stream content analysis unit, a condensed stream for each group;

determining, by a key-frame sequence generate unit of the stream content analysis unit, whether a representative frame of the condensed stream is a key frame; and using intra-coding to re-encode, by the key-frame sequence generate unit, the representative frame of the condensed stream generated by the stream content analysis unit to an intra-coded key frame and generate a new key frame sequence when the representative frame is not a key frame;

adjusting, by a frame timestamp adjust unit, a timestamp of each frame in the condensed stream and recording the timestamps in a frame timestamp adjust table;

attaching, by a streaming data output unit, content identifying labels and tables to the condensed stream; and transmitting, by the streaming data output unit, the condensed stream to the client player to display.

16. The method for providing and transmitting a condensed stream as claimed in claim 15, wherein one category of the attribute are encoding format, frame rates or video formats.

17. The method for providing and transmitting a condensed stream as claimed in claim 15, wherein one category of the attribute are semantic attributes.

18. The method for providing and transmitting a condensed stream as claimed in claim 15, wherein one category of the attribute are static definition and classification.

19. The method for providing and transmitting a condensed stream as claimed in claim 15, further comprising:

recording grouping results which specify what input streaming content group each source belongs to in a group result table.

20. The method for providing and transmitting a condensed stream as claimed in claim 15, further comprising:

detecting, by a quality of service controller, a congestion status of the network between the stream condense unit and the client player, and feeding back estimated results to the stream content analysis unit;

receiving, by a client request handler, a stream composition adjust request and a client source request sent by the client player; and transmitting, by the client request handler, a client source request for querying source streaming contents that the client player requested to the streaming server by querying the stream input table.

21. The method for providing and transmitting a condensed stream as claimed in claim 15, wherein the content analysis is used to determine the importance of the plurality of streaming content groups by detecting types of events, weights, and weighting factors of the plurality of streaming content groups.

* * * * *